(12) United States Patent
Nambara et al.

(10) Patent No.: US 11,553,108 B2
(45) Date of Patent: Jan. 10, 2023

(54) READING DEVICE, IMAGE FORMING APPARATUS, AND METHOD

(71) Applicants: Kohsuke Nambara, Kanagawa (JP); Tadaaki Oyama, Kanagawa (JP); Ayumu Hashimoto, Kanagawa (JP); Masamoto Nakazawa, Kanagawa (JP)

(72) Inventors: Kohsuke Nambara, Kanagawa (JP); Tadaaki Oyama, Kanagawa (JP); Ayumu Hashimoto, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/481,676

(22) Filed: Sep. 22, 2021

(65) Prior Publication Data
US 2022/0109778 A1   Apr. 7, 2022

(30) Foreign Application Priority Data
Oct. 1, 2020 (JP) .............................. JP2020-167282

(51) Int. Cl.
*H04N 1/409* (2006.01)
*H04N 1/203* (2006.01)
(Continued)

(52) U.S. Cl.
CPC ....... *H04N 1/4095* (2013.01); *H04N 1/00013* (2013.01); *H04N 1/00037* (2013.01);
(Continued)

(58) Field of Classification Search
CPC ........... H04N 1/00013; H04N 1/00037; H04N 1/00087; H04N 1/00795; H04N 1/0282;
(Continued)

(56) References Cited

U.S. PATENT DOCUMENTS 7,659,532 B2 * 2/2010 Kikuchi ................. H04N 1/203
358/509
9,742,930 B2 * 8/2017 Matsumi ............ H04N 1/00068
(Continued)

FOREIGN PATENT DOCUMENTS

| JP | 10-262147 | 9/1998 |
|---|---|---|
| JP | 2002-057848 | 2/2002 |
| JP | 2013-070208 | 4/2013 |

*Primary Examiner* — Negussie Worku
(74) *Attorney, Agent, or Firm* — Harness, Dickey & Pierce, P.L.C.

(57) ABSTRACT

A reading device includes a first light source, a second light source, a first reading unit, a second reading unit, a comparison unit, and a correction unit. The first source irradiates an object to be read, with first light having a first transmittance to the object. The second source irradiates the object with second light having a second transmittance to the object. The first reading unit reads the first light from the object to output first image data. The second reading unit reads the second light from the object to output second image data. The comparison unit compares a data difference between the first and second image data. In a case where the data difference is equal to or larger than a threshold, the correction unit corrects data of an image area having the data difference equal to or larger than the threshold in the first or second image data.

20 Claims, 31 Drawing Sheets

(51) Int. Cl.
   *H04N 1/00*   (2006.01)
   *H04N 1/028*   (2006.01)
(52) U.S. Cl.
   CPC ..... *H04N 1/00087* (2013.01); *H04N 1/00795* (2013.01); *H04N 1/0282* (2013.01); *H04N 1/2032* (2013.01)
(58) Field of Classification Search
   CPC .. H04N 1/2032; H04N 1/4095; H04N 9/3164; H04N 9/3155; H04N 5/33; H04N 9/3182; H04N 9/73; H04N 5/2258; H04N 1/60
   USPC .......................................................... 358/1.1
   See application file for complete search history.

(56) References Cited

U.S. PATENT DOCUMENTS

| | | | |
|---|---|---|---|
| 10,466,359 B2* | 11/2019 | Meir | G01S 7/4863 |
| 2001/0015828 A1* | 8/2001 | Miyamoto | H04N 1/00013 358/474 |
| 2003/0128889 A1* | 7/2003 | Maeda | H04N 5/253 348/E5.049 |
| 2017/0295298 A1 | 10/2017 | Ozaki et al. | |
| 2018/0146150 A1 | 5/2018 | Shirado et al. | |
| 2019/0327387 A1 | 10/2019 | Hashimoto et al. | |
| 2020/0053230 A1 | 2/2020 | Nakazawa et al. | |
| 2020/0244837 A1 | 7/2020 | Tsukahara et al. | |
| 2020/0252513 A1 | 8/2020 | Nakada et al. | |
| 2020/0336615 A1 | 10/2020 | Ono et al. | |
| 2021/0014441 A1 | 1/2021 | Ohmiya et al. | |
| 2021/0227087 A1* | 7/2021 | Ozaki | H04N 1/00854 |
| 2021/0227098 A1* | 7/2021 | Muraishi | H04N 1/00037 |
| 2021/0234981 A1* | 7/2021 | Ouchi | H04N 1/00708 |
| 2021/0360120 A1* | 11/2021 | Inaba | H04N 1/00037 |
| 2021/0409566 A1* | 12/2021 | Hashimoto | H04N 1/00037 |
| 2022/0109566 A1* | 4/2022 | Si | H04L 9/0643 |

\* cited by examiner

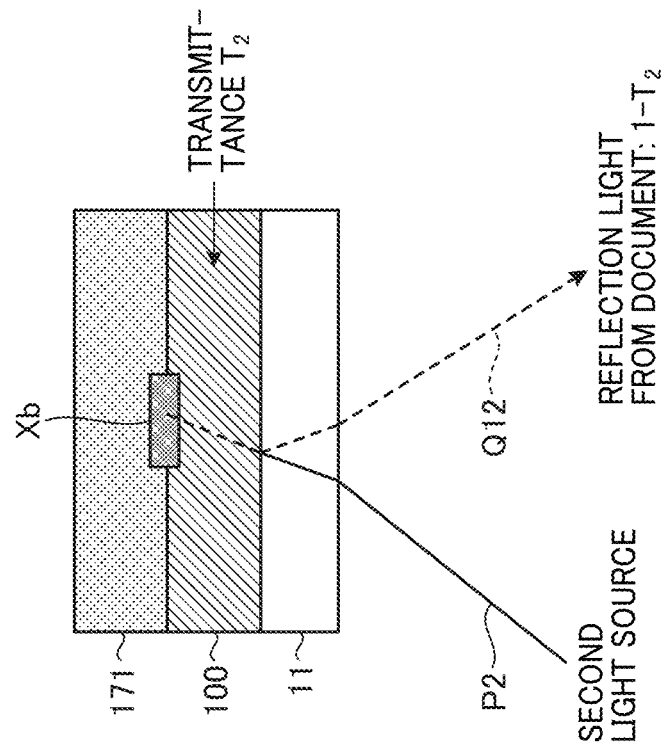
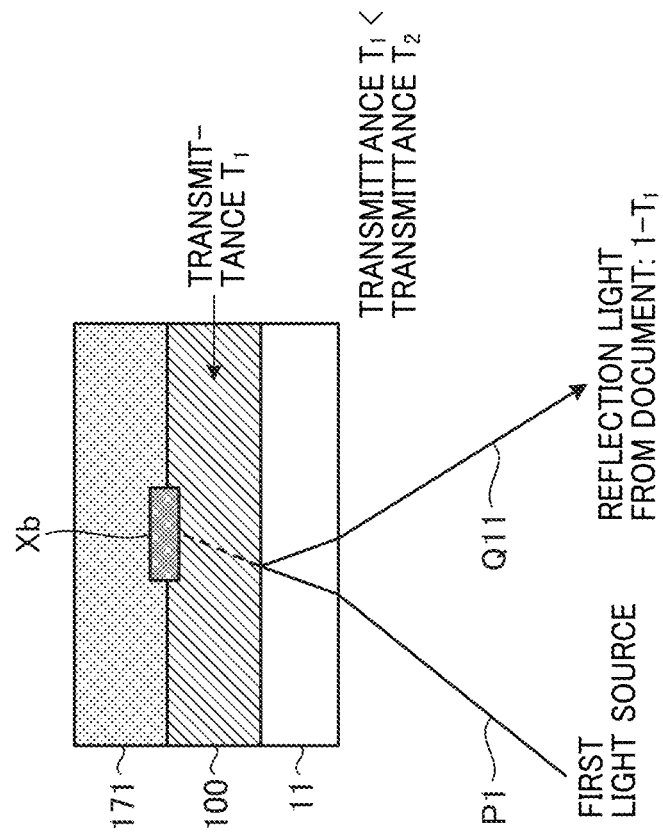

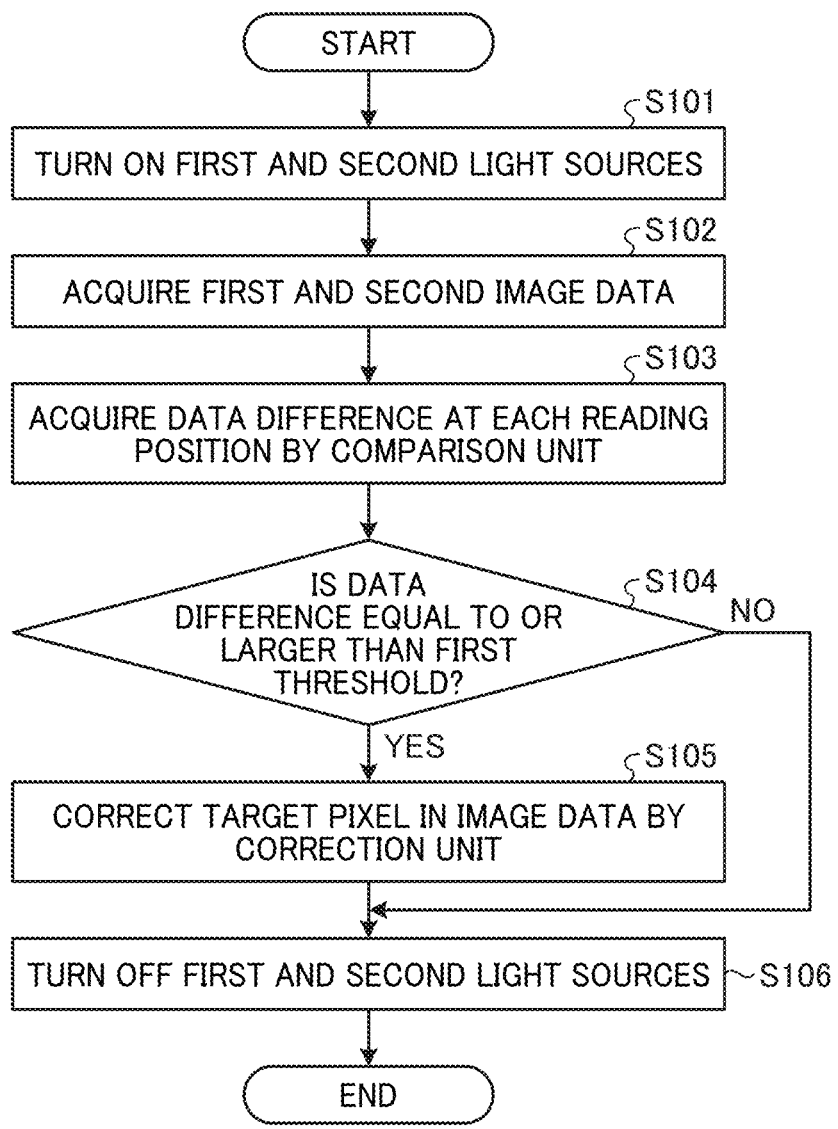

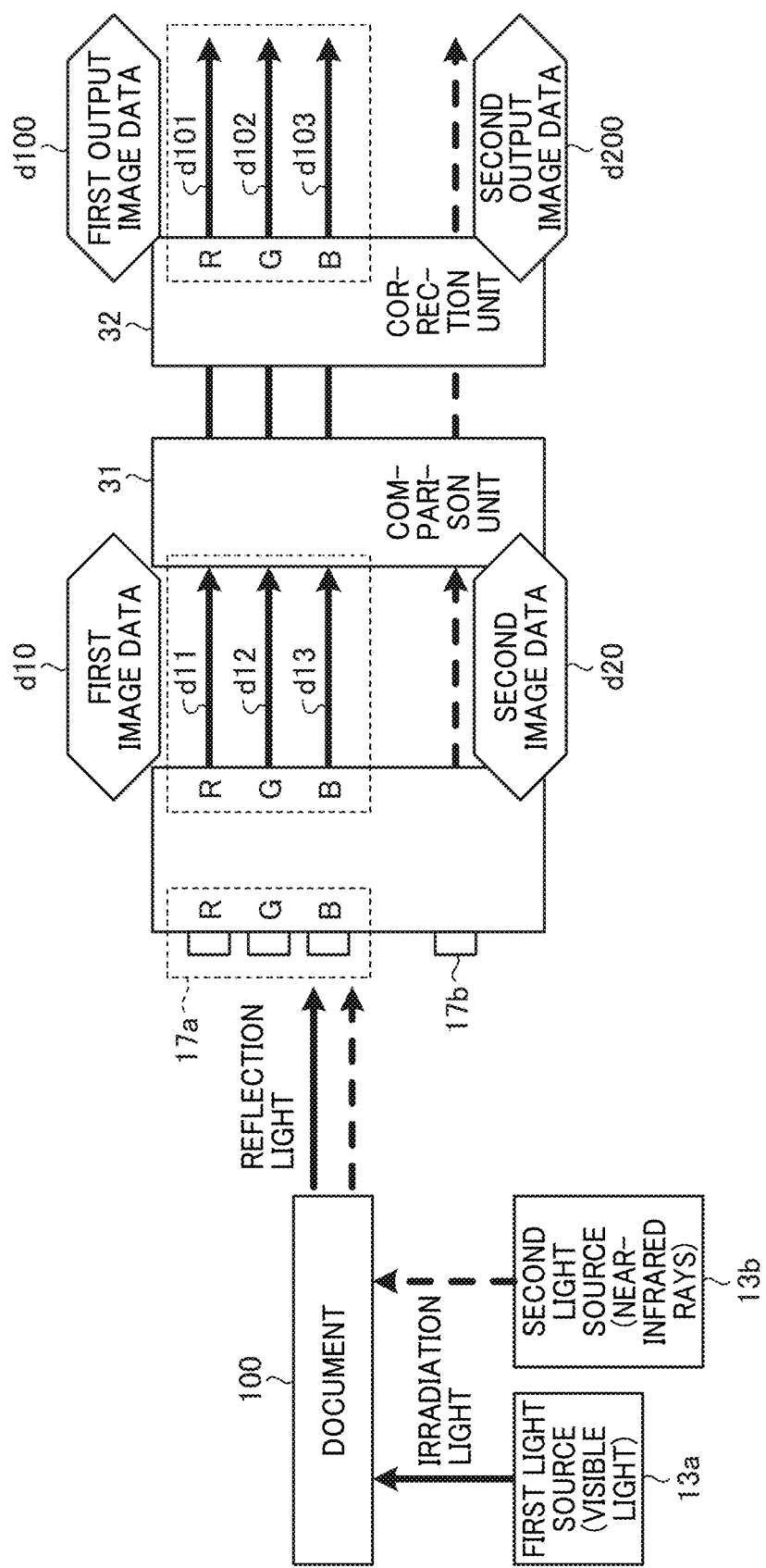

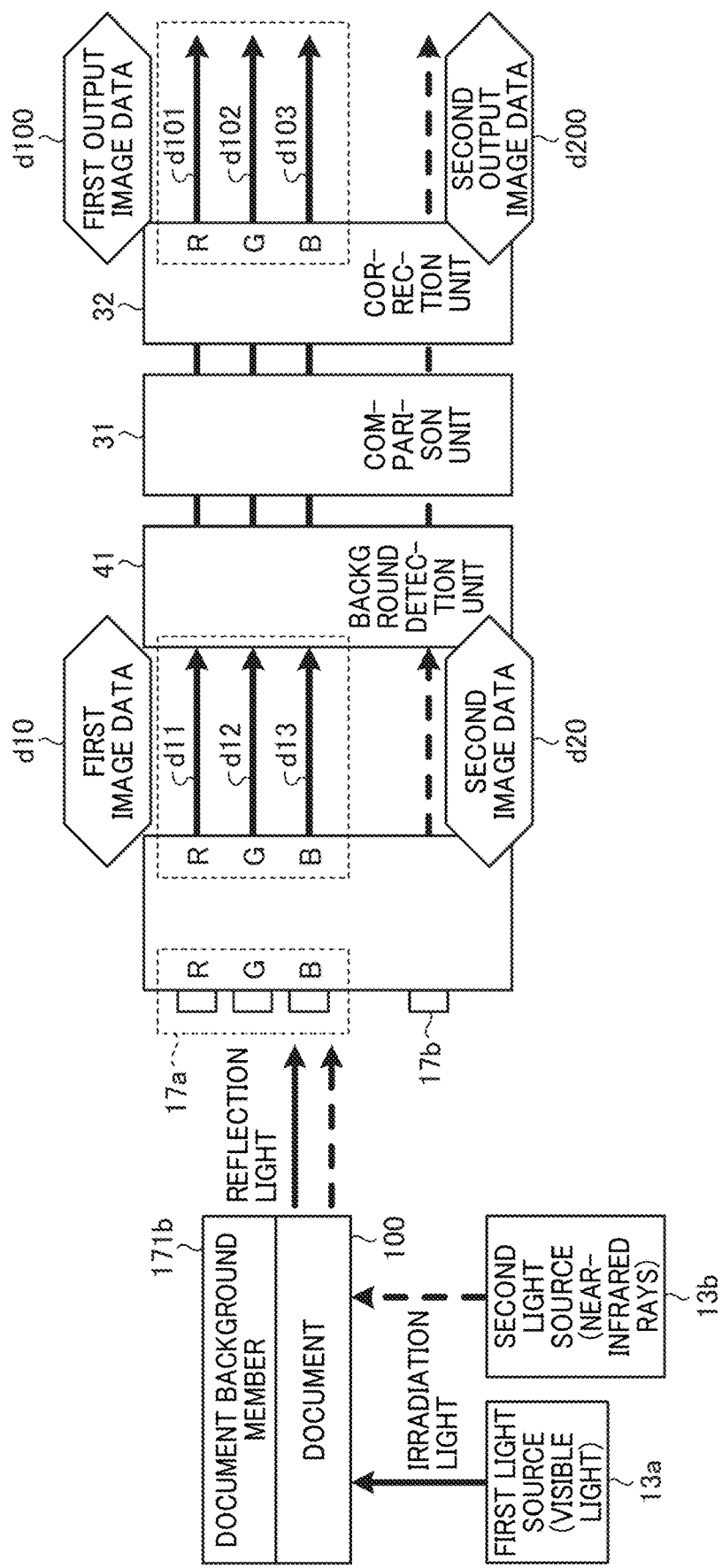

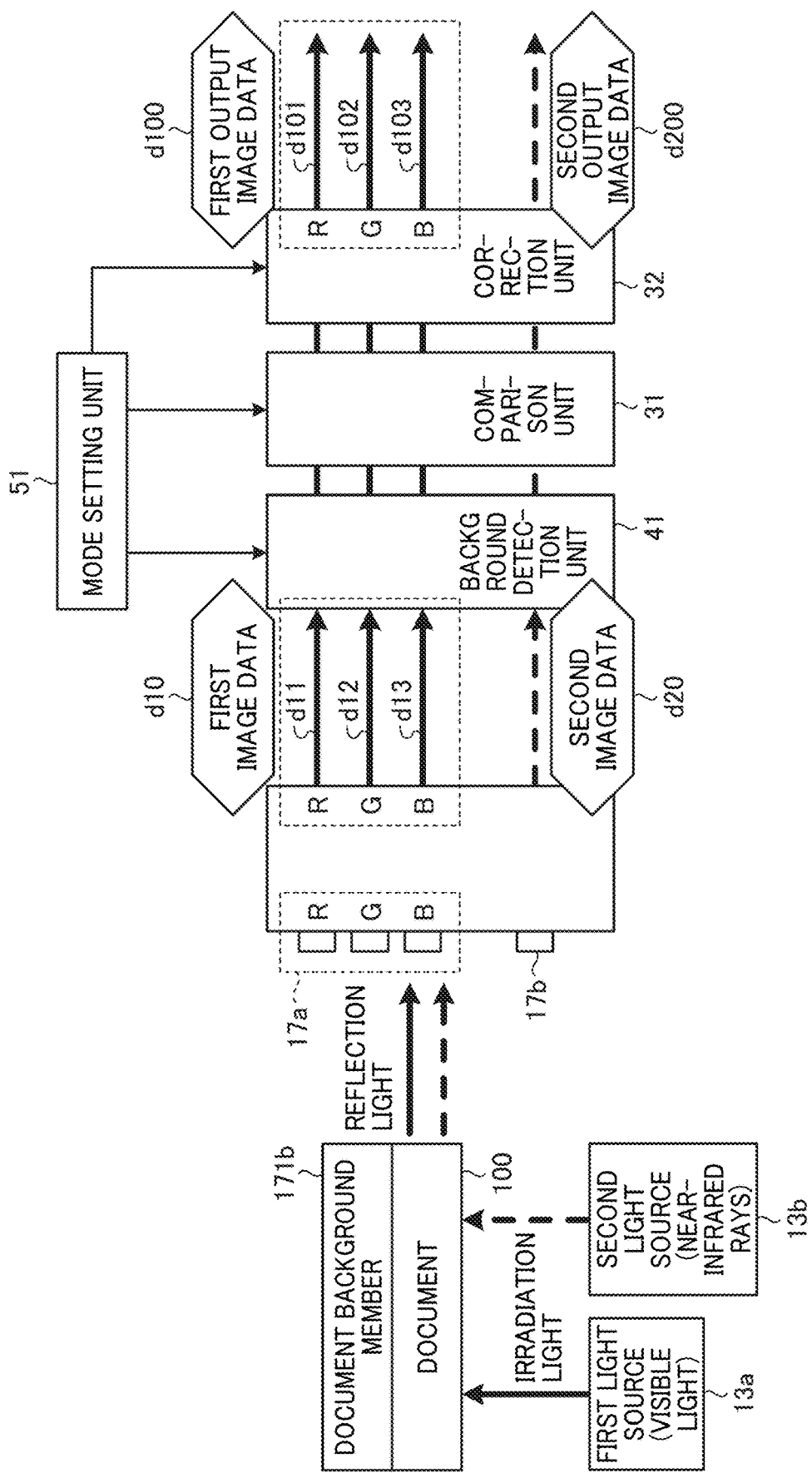

READING DEVICE, IMAGE FORMING APPARATUS, AND METHOD

CROSS-REFERENCE TO RELATED APPLICATIONS

This patent application is based on and claims priority pursuant to 35 U.S.C. § 119(a) to Japanese Patent Application No. 2020-167282, filed on Oct. 1, 2020, in the Japan Patent Office, the entire disclosure of which is hereby incorporated by reference herein.

BACKGROUND

Technical Field

Embodiments of the present disclosure relate to a reading device, an image forming apparatus, and a method.

Discussion of the Background Art

Conventionally, in a case where a document having high transmittance is read by an image reading device or the like, irradiation light transmitted through the document may be reflected by a background plate to cause back side reflection. For example, when a duplex-print document is read, reflection light reflected by the background plate is absorbed by the print portion on the back side of the document, and the print portion on the back side appears as back side reflection on the image obtained by reading the front side of the document.

Therefore, there have been disclosed techniques by which an image of another light amount, a back side image, or the like is separately acquired in order to remove the back side reflection from the read image on the basis of the acquired image. In addition, there have been disclosed techniques for creating a luminance histogram of an acquired image and removing back side reflection from the acquired image on the basis of the luminance of the maximum frequency.

SUMMARY

According to an embodiment of the present disclosure, a reading device includes a first light source, a second light source, a first reading unit, a second reading unit, a comparison unit, and a correction unit. The first light source irradiates an object to be read, with first light having a first transmittance to the object. The second light source irradiates the object with second light having a second transmittance to the object. The second transmittance is different from the first transmittance. The first reading unit reads the first light of the first light source from the object to output first image data. The second reading unit reads the second light of the second light source from the object to output second image data. The comparison unit compares a data difference between the first image data and the second image data. In a case where the data difference is equal to or larger than a threshold, the correction unit corrects data of an image area having the data difference equal to or larger than the threshold in the first image data or the second image data.

According to another embodiment of the present disclosure, a method includes: irradiating an object to be read, with first light of a first light source having a first transmittance to the object and second light of a second light source having a second transmittance to the object, the second transmittance being different from the first transmittance; reading the first light from the object by a first reading unit to output first image data; reading the second light from the object by a second reading unit to output second image data; comparing a data difference between the first image data and the second image data; and in a case where the data difference is equal to or larger than a threshold, correcting data of an image area having the data difference equal to or larger than the threshold in the first image data or the second image data.

According to still another embodiment of the present disclosure, a reading device includes a first light source, a second light source, a first sensor, a second sensor, and processing circuitry. The first light source irradiates an object to be read, with first light having a first transmittance to the object. The second light source irradiates the object with second light having a second transmittance to the object. The second transmittance is different from the first transmittance. The first sensor reads the first light of the first light source from the object to output first image data. The second sensor reads the second light of the second light source from the object to output second image data. The processing circuitry compares a data difference between the first image data and the second image data; and, in a case where the data difference is equal to or larger than a threshold, corrects data of an image area having the data difference equal to or larger than the threshold in the first image data or the second image data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B are explanatory diagrams of respective reflection light intensities of irradiation light of a first light source and a second light source of the reading device;

FIG. 7 is a flowchart of an example of one reading operation performed by the reading device;

FIG. 13 is a diagram illustrating an example of a configuration for suppressing back side reflection in a visible light image;

FIG. 25 is a diagram illustrating an example of a configuration of a reading device for suppressing back side reflection according to a sixth modification;

FIG. 27 is a diagram illustrating an example of a configuration of a reading device for suppressing back side reflection according to a seventh modification;

Figure 1:
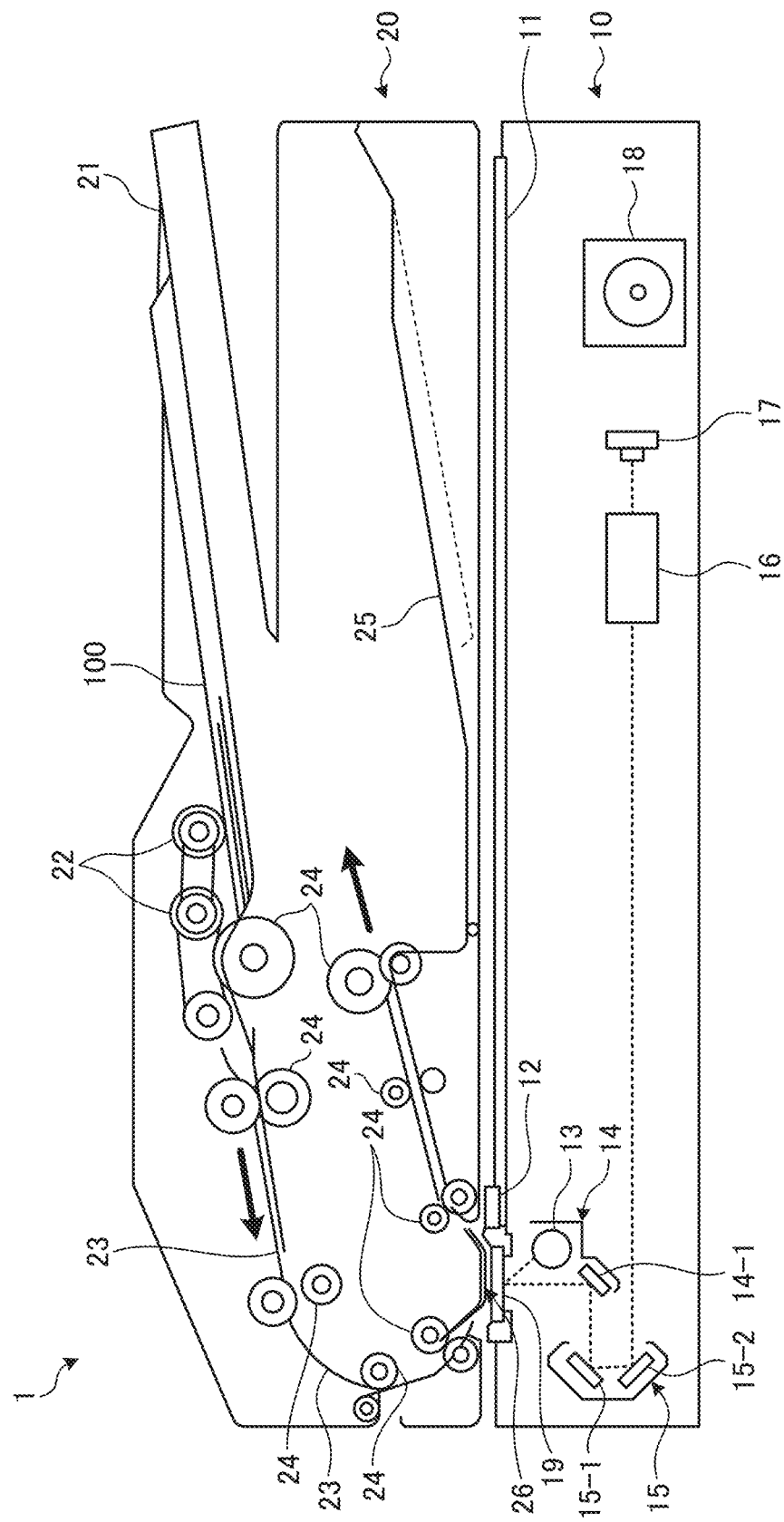
FIG. 1 is a diagram illustrating an example of a reading device according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a reading device, an image forming apparatus, and a method will be described in detail with reference to the accompanying drawings. In the following description, in a case where a wavelength range of visible light (visible light wavelength range) is targeted, light is referred to as visible light, and in a case where a wavelength range of infrared rays, ultraviolet rays, or the like other than visible light is targeted, light is referred to as invisible light.

First Embodiment

FIG. 1 is a diagram illustrating an example of a reading device according to a first embodiment. FIG. 1 illustrates a configuration of the reading device equipped with an automatic document feeder (ADF) as an example of a reading device.

The reading device main body 10 includes a contact glass 11 on the top, and includes inside a light source 13, a first carriage 14, a second carriage 15, a lens unit 16, a sensor board 17, and the like, which are a reading unit of a reduction optical system. Referring to FIG. 1, the first carriage 14 includes a light source 13 and a reflection mirror 14-1, and the second carriage 15 includes reflection mirrors 15-1 and 15-2.

In the reading unit described as an example, a reading target is irradiated with light of the light source 13, reflection light from the reading target is folded back by the mirror 14-1 of the first carriage 14 or the mirrors 15-1 and 15-2 of the second carriage 15 and is incident on the lens unit 16, and an image of the reading target is formed by the lens unit 16 on the light receiving surface on a sensor board 17. The sensor board 17 includes line sensors such as charge coupled device (CCD) sensors or complementary MOS (CMOS) sensors, and sequentially converts images of the reading target formed on the light receiving surface into an electric signal by the line sensor. A reference white board 12 is used for changing the amount of light of the light source 13, correcting variations in pixels (pixel circuits) of the line sensors, and the like.

The reading device 1 includes a control board in the reading device main body 10 and controls the units of the reading device main body 10 and the units of the ADF 20 to read the reading target by a predetermined reading method. The reading target is, for example, a recording medium on which characters, patterns, or the like are formed or a recording medium before image formation. In the following description, a document (also referred to as a document sheet) will be taken as an example of a recording medium.

The reading device 1 reads a document 100 by a sheet through method using the ADF 20. In the configuration illustrated in FIG. 1, the reading device 1 separates a bundle of sheets of the document 100 in a tray 21 of the ADF 20 one by one by the pickup roller 22, conveys each sheet of the document 100 in a conveyance path 23, reads the reading target side of the document 100 at a predetermined reading position, and then ejects the document 100 to the output tray 25. The document 100 is conveyed by rotation of various conveyance rollers 24.

The document 100 is read at a timing when the document 100 passes between a reading window 19 and a background part 26 while the reading device 1 moves and fixes the first carriage 14 and the second carriage 15 to predetermined home positions, for example. The reading window 19 is a slit-shaped reading window provided in a part of the contact glass 11, and the document 100 is passed through the reading window 19 by automatic conveyance, so that the document 100 is scanned in a sub-scanning direction. The background part 26 is a background member for a predetermined background color that is arranged at a position facing the slit. In the reading device 1, while the document 100 passes through the reading window 19, line sensors on the sensor board 17 sequentially read reflection light of the light source 13 emitted to the first side (for example, the front side) of the document 100 facing the reading window 19.

In a case of reading both sides of the document 100, for example, a reversing mechanism for reversing the front and back is provided. By providing the reversing mechanism, the reading device 1 can reverse the document 100 and read the second side (for example, the back side) of the document 100 by the reading window 19. The method for reading is not limited to the reversing mechanism, and other configurations may be used. For example, after passing through the reading window 19, the second side of the document 100 may be read by a reading unit provided on the back side of the document 100. In this case, a background member in white or the like arranged at a position facing the reading unit corresponds to the background part.

In the configuration of the reading device 1 of the present example, flat-bet reading is also possible. Specifically, the ADF 20 is lifted to expose the contact glass 11, and the document 100 is directly placed on the contact glass 11. Then, the ADF 20 is lowered to the original position, and the back side of the document 100 is pressed by the lower part of the ADF 20. In the flat-betting reading, since the document 100 is fixed, the document 100 is scanned while the carriages (the first carriage 14 and the second carriage 15) are moved with respect to the document 100. The first carriage 14 and the second carriage 15 are driven by a scanner motor 18 to scan the document 100 in the sub-scanning direction. For example, the first carriage 14 moves at a speed V, and at the same time, the second carriage 15 moves at a speed of ½ V, which is half the speed of the first carriage 14, to read the first side of the document 100 on the contact glass 11. In this case, the lower part of the ADF 20 (the background member in white or the like that presses the document 100 from the back side) corresponds to the background part.

In this example, the first carriage 14, the second carriage 15, the lens unit 16, the sensor board 17, and the like are separately illustrated, but they may be individually provided or may be provided as an integrated sensor module.

The reading device 1 according to the present embodiment detects and suppresses information on the back side reflected in image data obtained by reading a reading target, that is, back side reflection, from the image data obtained by reading the reading target. Here, the suppression includes a broad concept including relaxation of the degree of back side reflection, reduction of the degree of back side reflection, complete removal of back side reflection, and the like.

Figure 2:
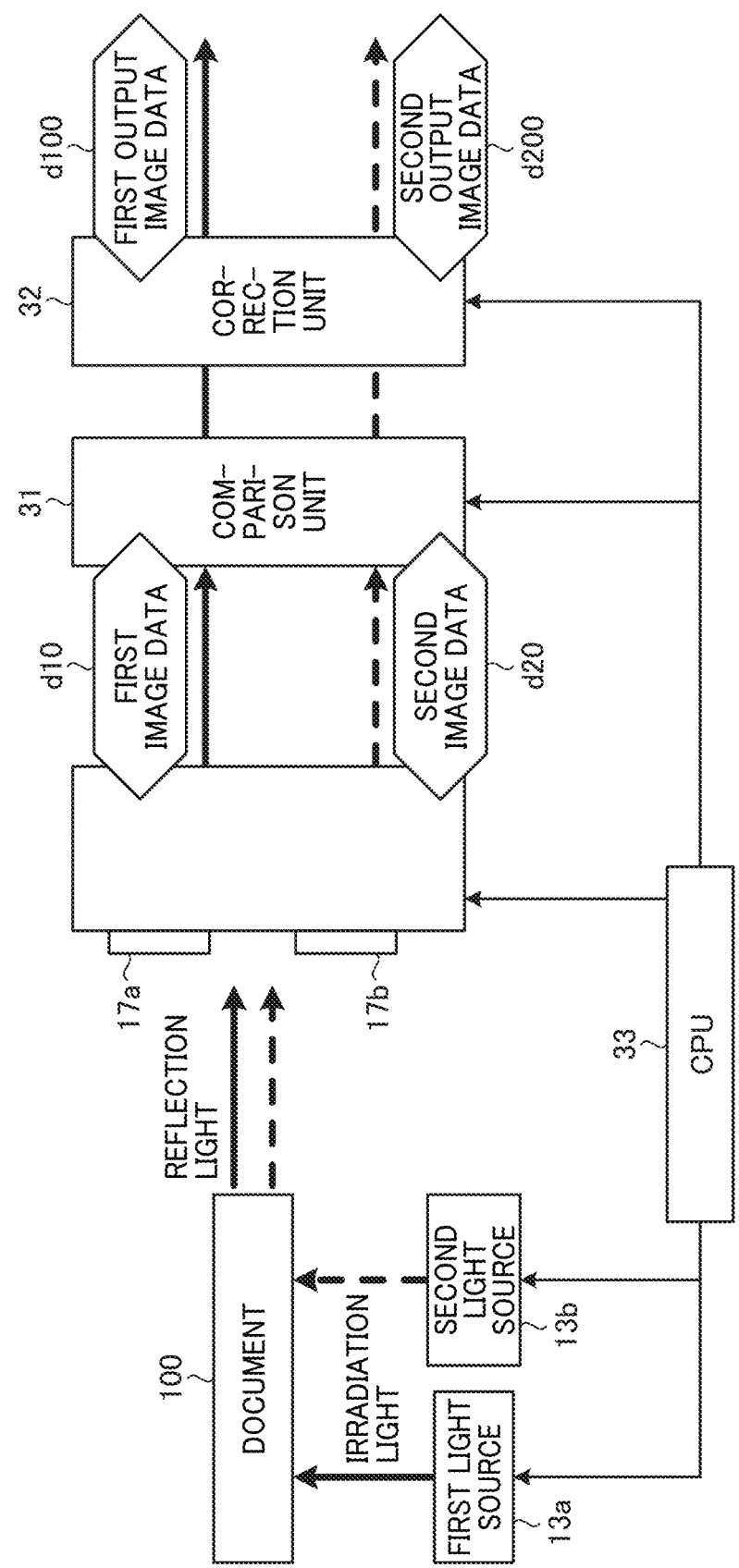
FIG. 2 is a diagram illustrating an example of a configuration related to suppression of back side reflection in the reading device.

FIG. 2 is a diagram illustrating an example of a configuration related to suppression of back side reflection in the reading device 1 according to the present embodiment. This configuration will be described in detail in comparison with the general arrangement (FIG. 1) of the reading device 1.

Both a first light source 13*a* and a second light source 13*b* are provided as the light source 13. The first light source 13*a* and the second light source 13*b* are light sources having different light transmittances with respect to the document 100. Respective light of the first light source 13*a* and the second light source 13*b* are applied to the document 100 at the reading position, and respective beams of reflection light of the irradiation light enter a first reading unit 17*a* and a second reading unit 17*b*.

The first reading unit 17*a* and the second reading unit 17*b* are two line sensors provided on the sensor board 17. The first reading unit 17*a* includes an imaging element having sensitivity in a wavelength range that enables reading of a document image from the document 100, converts received light into an electrical signal, and outputs first image data d10 obtained by reading the document image. The second reading unit 17*b* includes an imaging element having sensitivity in a wavelength range different from that of the first reading unit 17*a*, converts received light into an electrical signal, and outputs second image data d20.

Reflection light of the light applied to the document 100 enters both the first reading unit 17*a* and the second reading unit 17*b*, and the first image data d10 is output from the first reading unit 17*a* and the second image data d20 is output from the second reading unit 17*b*.

A comparison unit 31 compares the first image data d10 with the second image data d20 to detect a back side reflection area. For example, the comparison unit 31 compares the values of corresponding pixels between the first image data d10 and the second image data d20, and outputs a data difference for each pixel. The comparison unit 31 also determines pixels having data differences equal to or larger than a predetermined threshold as pixels in the back side reflection area. Although the data difference is output in units of pixels in this example, the output of the data difference is not limited to the units of pixels. In units of predetermined regions (collections of a plurality of pixels), the data difference such as an average value in each region may be output.

A correction unit 32 corrects the pixel values in the image area detected as having back side reflection by the comparison unit 31. For example, in a case where the first image data d10 is a reading target, the correction unit 32 corrects the pixel values of the image area in the first image data d10 detected as having back side reflection, from values including back side reflection to values not including back side reflection, for example, to the pixel values of the surrounding pixels. The correction unit 32 outputs the corrected image as first output image data d100. In this case, the second image data d20 is used as comparison data.

On the other hand, in a case where the second image data d20 is a reading target, the correction unit 32 corrects the pixel values of the image area in the second image data d20 detected as having back side reflection, and outputs corrected second output image data d200. In this case, the first image data d10 is comparison data.

The comparison unit 31 and the correction unit 32 are included in the sensor board 17, a control board electrically connected to the sensor board 17, or the like. The comparison unit 31 and the correction unit 32 may be provided by hardware such as an application specific integrated circuit (ASIC), for example, or may be implemented as functional units by executing programs on a computer.

The first light source 13*a*, the second light source 13*b*, the first reading unit 17*a*, the second reading unit 17*b*, the comparison unit 31, and the correction unit 32 operate on the basis of drive signals from a central processing unit (CPU) 33.

Next, a method of suppressing back side reflection will be described in more detail. First, the principle of occurrence of back side reflection will be described, and then the method of suppressing back side reflection will be described in detail.

Figure 3B:
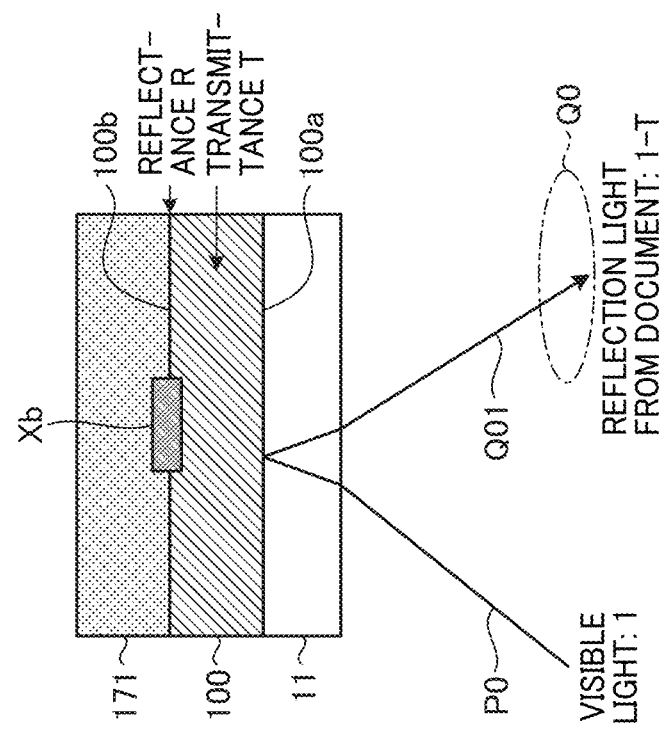
FIGS. 3A and 3B are diagrams describing a principle of occurrence of back side reflection.
Figure 3A:
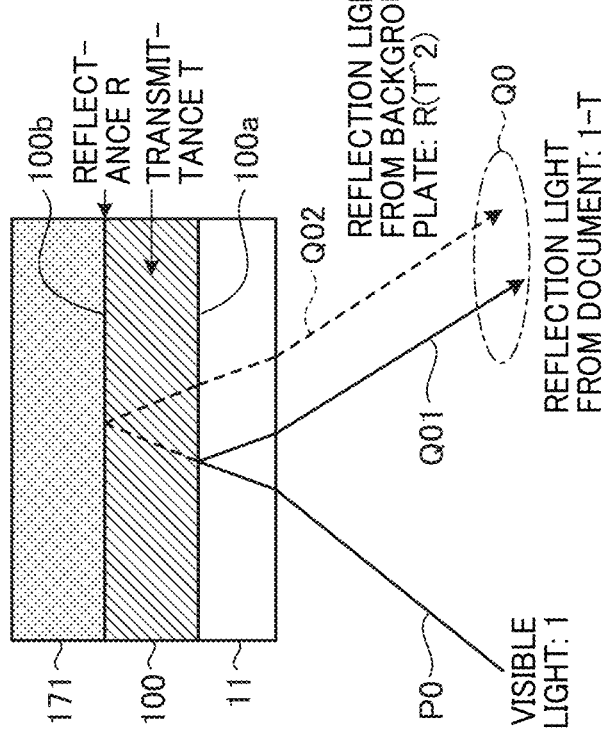

FIGS. 3A and 3B are diagrams describing the principle of occurrence of back side reflection. Hereinafter, a side of a reading target will be described as a first side 100a. In this case, the second side is a back side 100b. Generally, the reading device irradiates the first side 100a of the document 100 with visible light, and reads reflection light of the first side 100a by the reading unit to acquire image data of the first side 100a. FIG. 3A illustrates a state of reflection of light from the document 100 that does not include characters, patterns, and the like in the back side 100b, and FIG. 3B illustrates a state of reflection of light from the document 100 that includes characters, patterns, and the like in the back side 100b.

FIGS. 3A and 3B schematically illustrate arrangement of the document 100, the contact glass 11, and a background plate 171 at the reading position in the thickness direction of the document 100. That is, the contact glass 11 is located on the first side 100a of the document 100, and the background plate 171 is located on the back side 100b. The background plate 171 corresponds to the above-described various background parts. Characters Xb illustrated in FIG. 3B are an example of characters or a picture. The position and range of the characters Xb on the back side 100b are arbitrary.

As illustrated in FIG. 3A, generally, the visible light (irradiation light P0) applied to the document 100 includes first reflection light Q01 reflected by the first side 100a of the document 100, and second reflection light Q02 transmitted through the document 100 and reflected by the background plate 171, and the respective beams of light enter the reading unit and are read as an image.

Here, assuming that the value of the irradiation light P0 is 1, the transmittance of the document 100 is T, and the reflectance of the background plate 171 is R, the reflection light Q0 from the document 100 irradiated with the irradiation light P0 can be expressed by the following formula (1). In the following formula (1), light absorption on the document surface is ignored for easy understanding of the description.

$$Q0 = (1-T) + R*T^2 \qquad (1)$$

When the document 100 is irradiated with light, a beam of the light is reflected by the first side 100a of the document 100 and the other beam of the light is transmitted through the document 100, reflected by the background plate 171, transmitted through the document 100 again, and emitted from the document 100. The light reflected from the background plate 171 is represented by the square of the document transmittance because the light is transmitted through the document 100 twice.

On the other hand, as illustrated in FIG. 3B, in a case where the characters Xb are present on the back side 100b of the document 100, since the light transmitted through the document 100 is absorbed by the characters Xb on the back side 100b of the document 100, the second reflection light Q02 is substantially 0 and is not incident on the reading unit, and substantially the first reflection light Q01 is incident on the reading unit and is read as an image.

In the area where the characters Xb are present on the back side 100b of the document 100, the light transmitted through the document 100 is absorbed by the characters Xb, so that the reflection light Q0 is expressed as in the following formula (2).

$$Q0 = 1-T \qquad (2)$$

That is, the area where the characters Xb are present on the back side 100b of the document 100 becomes dark due to less reflection light than the area where the characters Xb are not present, which causes the characters on the back side 100b to appear as reflected in the read image data as back side reflection.

FIGS. 4A and 4B are explanatory diagrams of respective reflection light intensities of irradiation light of the first light source 13a and the second light source 13b of the reading device according to the first embodiment. FIG. 4A illustrates an example of a case where light of the first light source 13a is applied, and FIG. 4B illustrates an example of a case where light of the second light source 13b is applied. Here, the second light source 13b has higher transmittance of light through the document 100 than the first light source 13a as an example.

In the example of FIGS. 4A and 4B, the document transmittance of irradiation light P1 of the first light source 13a is denoted as T1, and the document transmittance of the irradiation light P2 from the second light source 13b is denoted as T2. In this case, reflection light Q from the document 100, that is, reflection light Q11 corresponding to the irradiation light P1 and reflection light Q12 corresponding to the irradiation light P2 can be expressed by the following formulas (3) and (4), respectively, in the area where the characters Xb are present on the back side 100b of the document 100.

$$Q11 = 1-T1 \qquad (3)$$

$$Q12 = 1-T2 \qquad (4)$$

From the formulas (3) and (4), it can be said that the reflection light intensity at the document 100 depends on the transmittances of light of the first light source 13a and the second light source 13b through the document 100. In addition, since the light is absorbed by the characters Xb, it can be said that as the document transmittance is higher, the light is more absorbed by the characters Xb and the reflection light intensity becomes lower, which more easily causes back side reflection. In this example, since the irradiation light P2 of the second light source 13b is higher in the document transmittance, the second image data d20 causes darker back side reflection than the first image data 10d.

As described above, by using a plurality of light sources having different document transmittances, it is possible to cause a difference in the level of back side reflection between the first image data d10 and the second image data d20. Therefore, by using one of the first image data d10 and the second image data d20 as comparison data, it is possible to detect the back side reflection of the other reading target image. For example, the absolute value of a difference between the pixel values in the areas of the characters Xb in the first image data d10 and the second image data d20 is acquired and set in advance as a first threshold, and the back side reflection area is detected in the image of the reading target read thereafter, on the basis of the first threshold.

Note that, there is a difference in absorption rate in the document 100 between the first light source 13a and the second light source 13b, so that a level difference in back side reflection occurs even in the area where the characters Xb are not present on the back side 100b of the document 100, but the level difference is smaller than that in the area where the characters Xb are present. Therefore, it is possible to separate the area with back side reflection from the area without back side reflection depending on the setting value of the first threshold.

In FIGS. 4A and 4B, the second light source 13b has a higher document transmittance than the first light source 13a. However, the present invention can be similarly applied to a case where the relationship in the document transmittance is reversed, that is, the first light source 13a has a higher document transmittance than the second light source 13b. Even if the relationship in the document transmittance is reversed, a level difference of back side reflection occurs between the first image data d10 and the second image data d20, and thus, the present invention can be applied to both the cases.

Figure 5B:
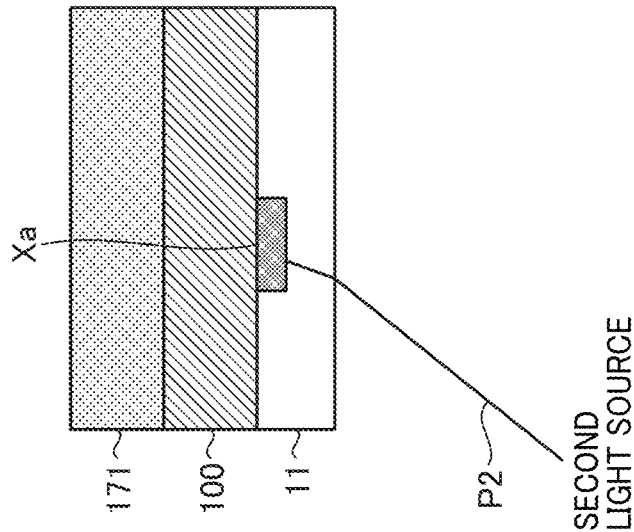
FIGS. 5A and 5B are diagrams illustrating examples of respective reflection light intensities of irradiation light of the first light source and the second light source in a case where characters are present on a first side of a document.
Figure 5A:
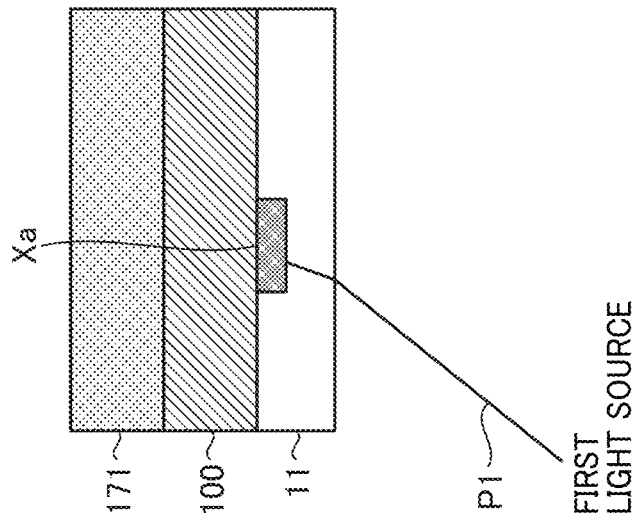

FIGS. 5A and 5B are diagrams illustrating examples of respective reflection light intensities of irradiation light of the first light source 13a and the second light source 13b in a case where characters Xa are present on the first side 100a of the document 100. FIG. 5A illustrates an example of a case where light of the first light source 13a is applied, and FIG. 5B illustrates an example of a case where light of the second light source 13b is applied.

As illustrated in FIGS. 5A and 5B, in a case where the characters Xa are present on the first side 100a, light is absorbed by the characters Xa on the first side 100a from both the first light source 13a and the second light source 13b. Therefore, the data difference between the first image data d10 and the second image data d20 obtained by receiving the respective beams of reflection light is small, which is not equal to or larger than the first threshold. Therefore, since the area of the characters Xa on the first side 100a is not a target of correction by the comparison unit 31, the pixel values of the characters Xa are not corrected by the correction unit 32, and the characters, pattern, and the like on the first side 100a as a reading target are reproduced as they are, thereby preventing occurrence of erroneous correction.

Figure 6A:
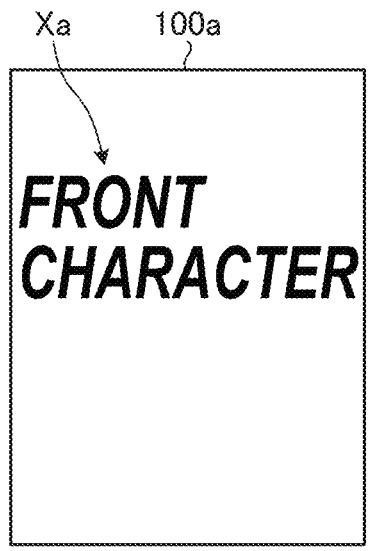
FIGS. 6A to 6D are diagrams illustrating images of output image data to which correction is performed.
Figure 6B:
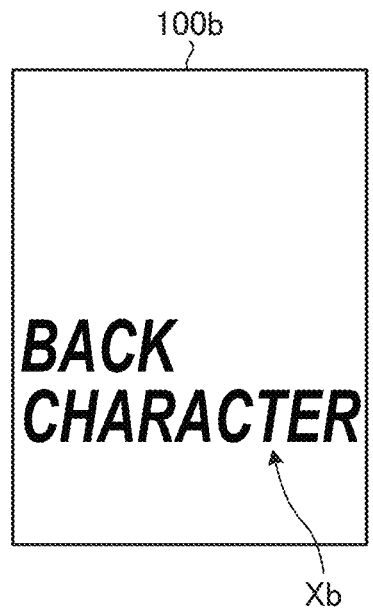
Figure 6C:
Figure 6D:
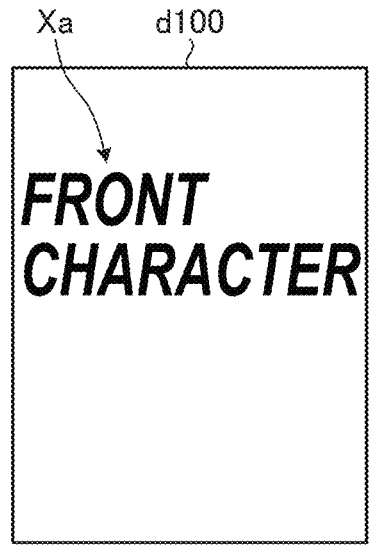

FIGS. 6A to 6D are diagrams illustrating images of output image data to which correction is performed. For comparison, FIG. 6A illustrates the first side 100a of the document 100 and FIG. 6B illustrates the back side 100b of the document 100. FIG. 6C illustrates an image of the first image data d10 before correction read by irradiating the first side 100a of the document 100 with light of the first light source 13a and the second light source 13b, and FIG. 6D illustrates an image of the first output image data d100 after correction.

As illustrated in FIGS. 6A and 6B, the document 100 is a duplex-print document including the characters Xa such as "front characters" on the first side 100a and the characters Xb such as "back characters" on the back side 100b.

When the first side 100a of the document 100 is irradiated with light of the first light source 13a and the second light source 13b and read by the first reading unit, the first image data d10 illustrated in FIG. 6C is output. As illustrated in FIG. 6C, the first image data d10 has a back side reflection Xc of the characters Xb due to absorption of light by the characters Xb on the back side 100b.

By executing the comparison unit 31 and the correction unit 32 to detect the area of the back side reflection Xc and correct the pixel values of the detected region, the difference in pixel value between the back side reflection Xc and the peripheral area is reduced or 0, and the back side reflection Xc is suppressed or removed as illustrated in FIG. 6D.

Flow of suppression of back side reflection The reading device 1 according to the present embodiment simultaneously turns on the first light source 13a for reading the first side 100a of document 100 and the second light source 13b having a transmittance of light through the document 100 different from the transmittance of first light source 13a, thereby acquiring a read image without back side reflection in one reading operation (scanning).

FIG. 7 is a flowchart of an example of one reading operation performed by the reading device 1. The reading device 1 controls the units by drive signals, and performs one reading operation in the following procedure. First, the reading device 1 turns on the first light source 13a and the second light source 13b (step S101).

Subsequently, the reading device 1 acquires the first image data d10 from the first reading unit 17a, and acquires the second image data d20 from the second reading unit 17b (S102). For example, the reading device 1 drives the first reading unit 17a and the second reading unit 17b at the same timing while both the first light source 13a and the second light source 13b are on, acquires the first image data d10 from the first reading unit 17a, and acquires the second image data d20 from the second reading unit 17b.

Subsequently, the reading device 1 outputs the first image data d10 and the second image data d20 acquired by the first reading unit 17a and the second reading unit 17b to the comparison unit 31, and acquires data differences at corresponding reading portions (in pixels in this example) between the first image data d10 and the second image data d20 (S103).

Further, the reading device 1 determines by the comparison unit 31 whether the data differences are equal to or larger than a predetermined threshold (first threshold) (S104). For example, the comparison unit 31 compares the data differences acquired in pixels with the threshold, and determines pixels having data differences equal to or larger than the threshold as correction targets.

When the data differences are equal to or larger than the threshold (Yes in S104), the reading device 1 corrects the portions of the image data equal to or larger than the threshold by the correction unit 32 (S105). That is, the reading device 1 corrects the pixels as correction targets from the values including the back side reflection to the values not including the back side reflection, thereby suppressing the back side reflection included in the first image data d10. Thereafter, the reading device 1 turns off the first light source 13a and the second light source 13b (step S106).

When the data differences are less than the threshold (No in S104), the reading device 1 determines that the image has no back side reflection, and turns off the first light source 13a and the second light source 13b (S106) without correcting the image data (S105). That is, since the first image data d10 does not include back side reflection, the data is output as it is without performing the correction of back side reflection.

As described above, the reading device 1 according to the first embodiment can acquire both the document image and the comparison data for determination on back side reflection in one reading operation, and output the data of the document image in which the back side reflection has been corrected at a high speed. As a result, the time for image acquisition including back side reflection correction can be shortened, and the processing of the back side reflection in the image can be shortened.

First Modification

A color material having a strong reflectance only in a specific single color among red (R), green (G), and blue (B) may exist as a reading target. When such a color material is used in the characters Xb on the back side 100b, the light of the color is not absorbed by the characters Xb but is reflected, and only the specific color is corrected, so that the image is not appropriately corrected. In the first modification, data for each color of R, G, and B is acquired as the first image data d10, and areas in which a level difference between a pixel value of any of RGB and a pixel value of the second image data is equal to or larger than the first threshold are corrected as areas with back side reflection.

Figure 8:
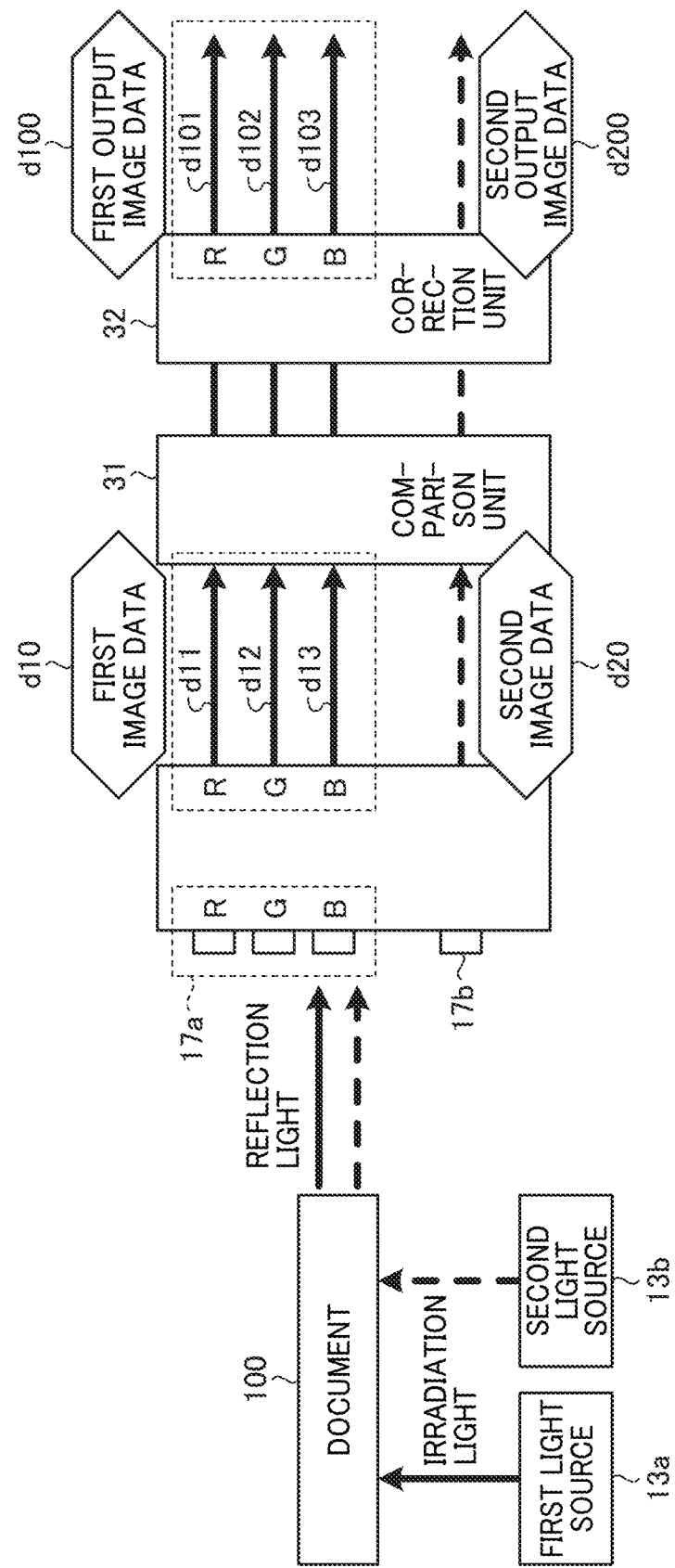
FIG. 8 is a diagram illustrating an example of a configuration of a part of a reading device for suppressing back side reflection according to a first modification.

FIG. 8 is a diagram illustrating an example of a configuration of a part of the reading device 1 for suppressing back side reflection according to the first modification. As illustrated in FIG. 8, in the configuration of the first modification, respective line sensors of RGB are provided in the first reading unit 17a, and respective image data of the colors (R image data d11, G image data d12, and B image data d13) read as the first image data d10 by the RGB line sensors is output from the first reading unit 17a to the comparison unit 31. The first light source 13a is a light source that emits light in a visible wavelength range, for example, light-emitting diodes (LEDs) of three colors RGB, but is not limited thereto. Although not illustrated, the units operate based on drive signals from the CPU 33 as in the first embodiment. In the configuration illustrated in FIG. 8, the reading device 1 according to the first modification is operated as described below.

Figure 9:
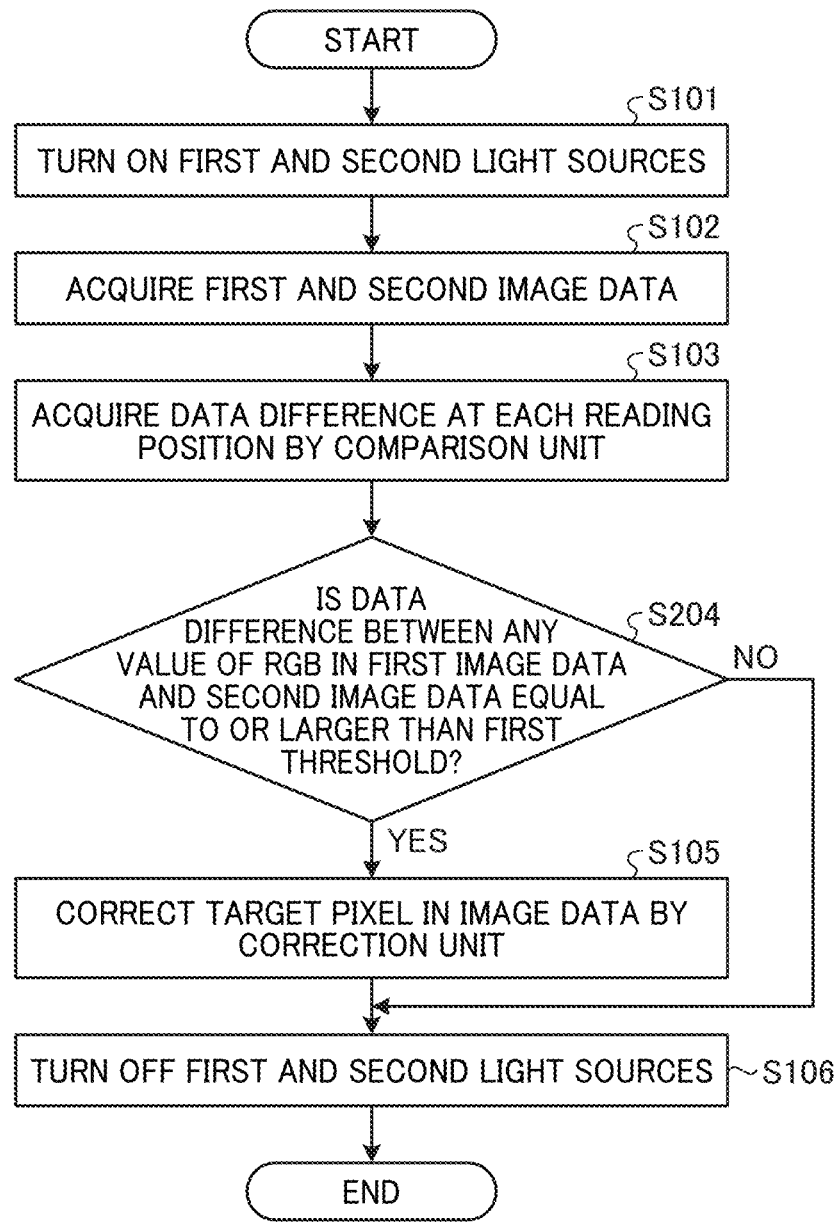
FIG. 9 is a flowchart of an example of one reading operation performed by the reading device.

FIG. 9 is a flowchart of an example of one reading operation performed by the reading device 1 according to the first modification. In the flow illustrated in FIG. 9, the same reference numerals are assigned to the same steps as those of the flow in the first embodiment (see FIG. 7). S101 to S103 illustrated in FIG. 9 correspond to S101 to S103 of the flow illustrated in FIG. 7, and thus redundant description thereof is omitted.

After S103, the reading device 1 determines b the comparison unit 31 whether the difference in pixel value between a pixel in the second image data d10 and the corresponding pixel in any one of the R image data d11, the G image data d12, and the B image data d13 included in the first image data d20 is greater than or equal to the first threshold (S204). The determination is sequentially performed for each pixel or for each predetermined pixel group. In a case where the data difference between any of the RGB pixel values and the pixel value in the second image data is equal to or larger than the first threshold (Yes in S204), the pixel is detected as a back side reflection area, and the correction unit 32 corrects the respective pixels in the image data in the colors corresponding to the pixel that is equal to or larger than the first threshold (S105). After all the corrections are completed, the reading device 1 turns off the first light source 13a and the second light source 13b, and ends the process (S106).

In a case where the data differences are less than the threshold in all the pixels (No in S204), the image has no back side reflection, and thus the reading device 1 turns off the first light source 13a and the second light source 13b without performing the correction (S105), and ends the process (S106).

Figure 10A:
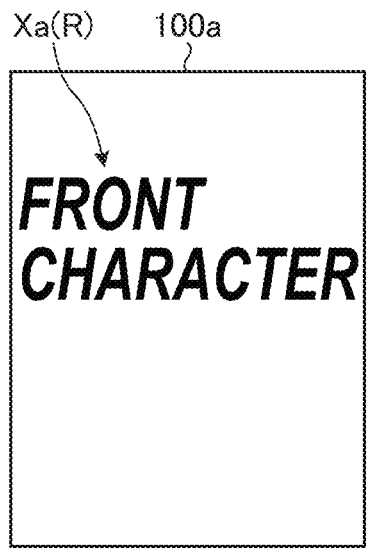
FIGS. 10A to 10D are diagrams illustrating images of output image data to which correction is performed.
Figure 10B:
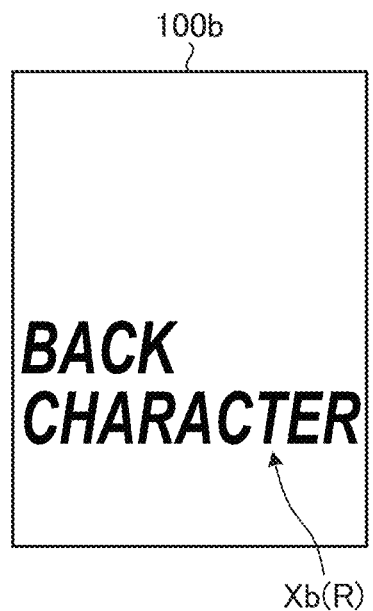
Figure 10C:
Figure 10D:
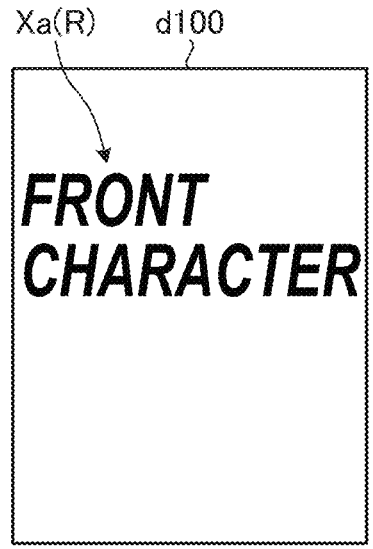

FIGS. 10A to 10D are diagrams illustrating images of output image data to which the correction of the first modification is performed. FIG. 10A illustrates the first side 100a of the document 100, and FIG. 10B illustrates the back side 100b of the document 100. FIG. 10C illustrates an image of the first image data d10 read by irradiating the first side 100a of the document 100 with light of the first light source 13a and the second light source 13b. FIG. 10D illustrates an image of the first output image data d100 after correction.

The first side 100a and second side 100b of the document 100 illustrated in FIGS. 10A and 10B respectively include characters Xa(R) and characters Xb(R) formed of a color material illustrating a high reflectance only in the R color.

In the reading device 1, when the first side 100a of the document 100 is irradiated with light of the first light source 13a and the second light source 13b and read by the first reading unit 17a, the first image data d10 illustrated in FIG. 10C is output from the first reading unit 17a. In the first image data d10 illustrated in FIG. 10C, the G light and the B light are absorbed by the characters Xb (R) on the back side 100b, and thus, a back side reflection Xc(R) of the characters Xb (R) is generated in the entire RGB image.

In the correction of the first modification, since the back side reflection is detected in respective images of the colors and the images of the colors are corrected if any back side reflection is detected. Accordingly, the back side reflection is appropriately removed from the corrected images, and the first output image data d100 in which the back side reflection Xc(R) is removed from the entire RGB image is output as illustrated in FIG. 6D. Here, images of the three colors RGB are used as an example, but images of at least two colors can also be applied.

Second Modification

In a case where a visible light source is used as the first light source 13a, a near-infrared light source may be used as the second light source 13b. Silicon is used for general semiconductor devices. By using the near-infrared light source, the reading unit can be easily configured from a general semiconductor device.

Figure 11:
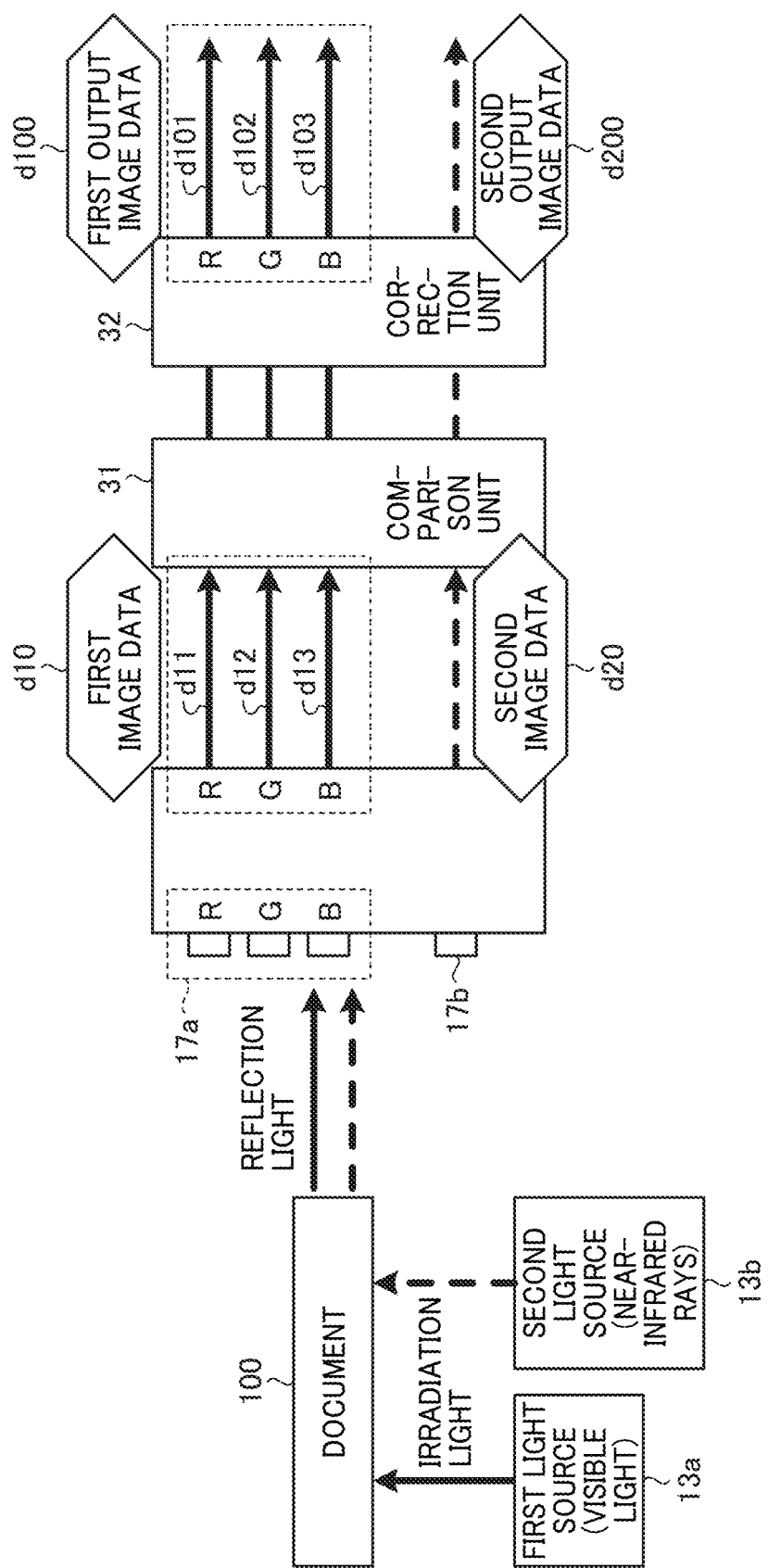
FIG. 11 is a diagram illustrating an example of a configuration of a part of a reading device for suppressing back side reflection according to a second modification.

FIG. 11 is a diagram illustrating an example of a configuration of a part of the reading device 1 for suppressing back side reflection according to the second modification. As illustrated in FIG. 11, a visible light source is used as first light source 13a, and a near-infrared light source is used as second light source 13b. With such a configuration, generally used silicon semiconductor devices can be applied to the line sensors of RGB in the first reading unit 17a and the line sensors in the second reading unit 17b.

Figure 12:
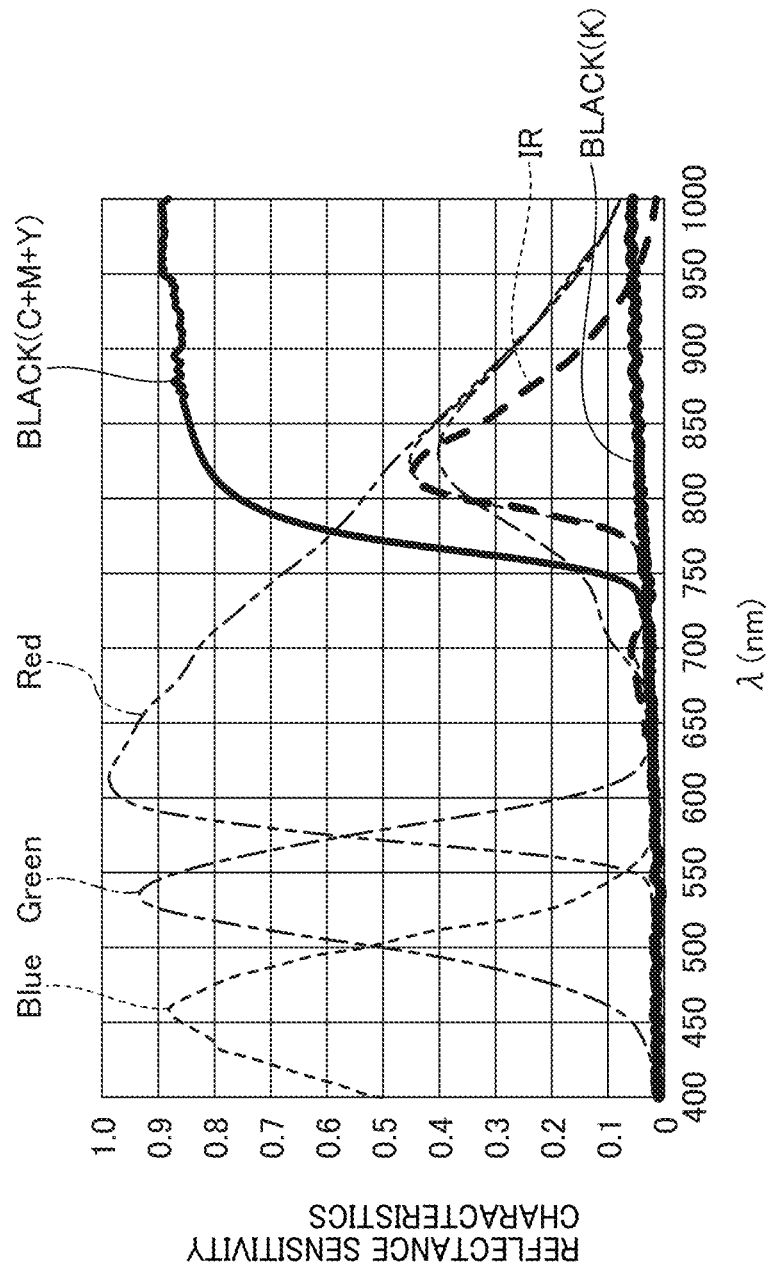
FIG. 12 is a diagram illustrating light-receiving sensitivity characteristics of a silicon semiconductor.

FIG. 12 is a diagram illustrating light-receiving sensitivity characteristics of a silicon semiconductor. FIG. 12 illustrates the light-receiving sensitivity characteristic by a dotted line graph. As illustrated in FIG. 12, the silicon semiconductor has peak sensitivities in wavelength regions of RGB of visible light, but also has peak sensitivities in a near-infrared wavelength region other than the visible light region. The solid line graph is obtained by superimposing the sensitivity characteristics of the case where the reading target is visually black made of CMY and the case where the reading target is black of the color material K. From the solid line graph, it can be seen that black formed of CMY is well detected with light in the near infrared range.

FIG. 13 is a diagram illustrating an example of a configuration for suppressing back side reflection in a visible light image. In the configuration of the second modification illustrated in FIG. 11, the correction unit 32 corrects the first image data d10. The first output image data d100 from which the back side reflection is removed by correcting first image data d10 obtained by visible light is generated.

Figure 14A:
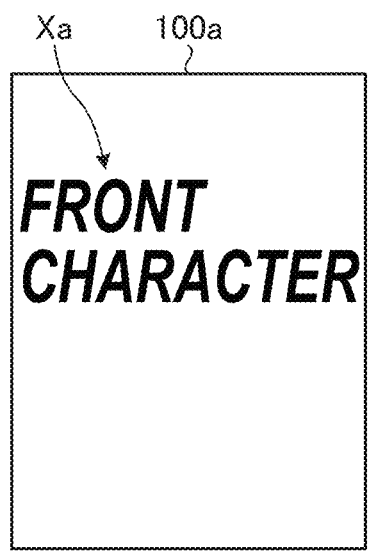
FIGS. 14A to 14D are diagrams illustrating examples of images of first output image data after correction.
Figure 14B:
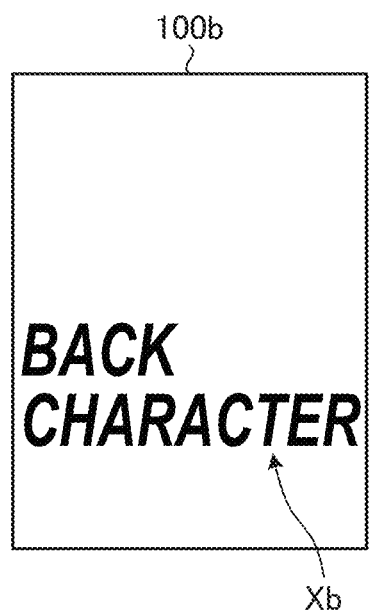
Figure 14C:
Figure 14D:
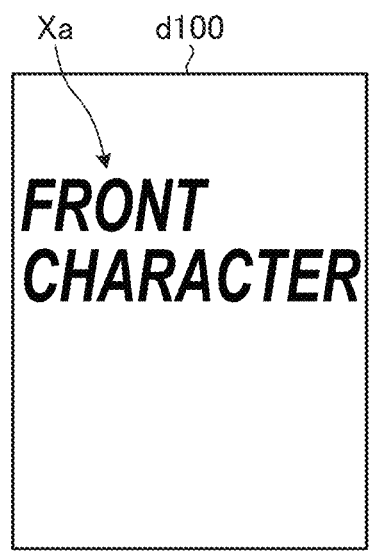

FIGS. 14A to 14D are diagrams illustrating examples of images of the first output image data d100 after correction. FIG. 14A illustrates the first side 100a of the document 100, and FIG. 14B illustrates the back side 100b of the document 100. FIG. 14C illustrates an image of the first image data d10 read by irradiating the first side 100a of the document 100 with visible light and near-infrared light. FIG. 14D illustrates an image of the first output image data d100 after correction. As illustrated in FIG. 14D, it is possible to acquire the first output image data (visible light image) without back side reflection.

Figure 15:
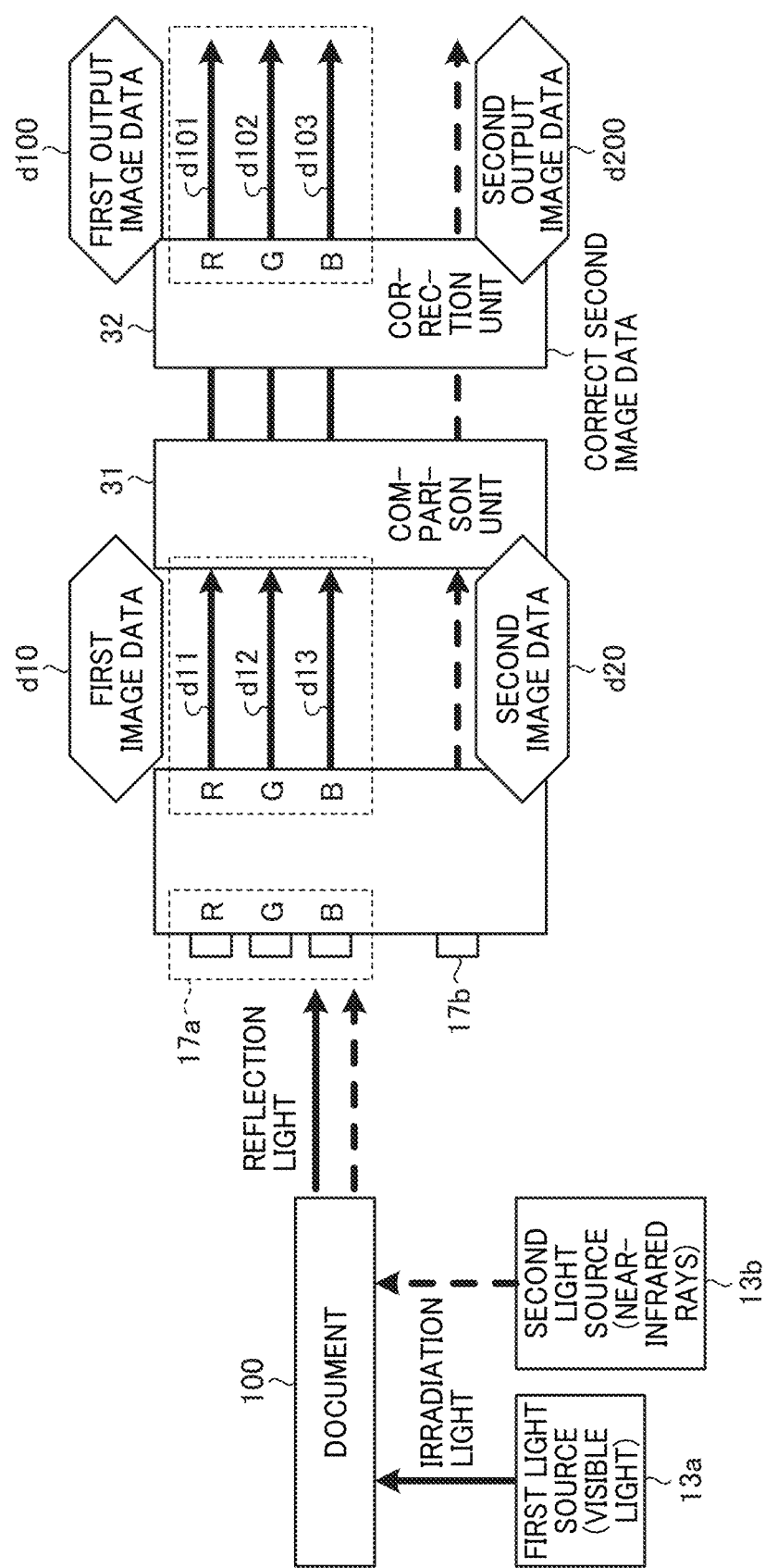
FIG. 15 is a diagram illustrating an example of a configuration for suppressing back side reflection in a near-infrared image.

FIG. 15 is a diagram illustrating an example of a configuration for suppressing back side reflection in a near-infrared image. In the configuration of the second modification illustrated in FIG. 11, the correction unit 32 corrects the second image data d20. The second output image data d200 from which the back side reflection is removed by correcting the second image data d20 obtained by the near-infrared light is generated.

Figure 16A:
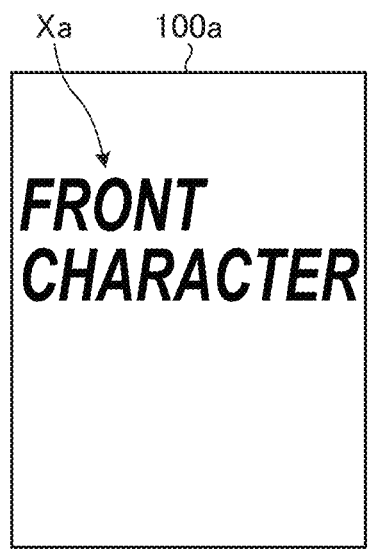
FIGS. 16A to 16D are diagrams illustrating examples of images of second output image data after correction.
Figure 16B:
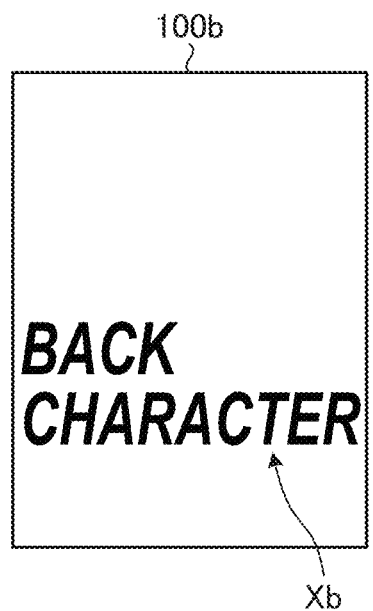
Figure 16C:
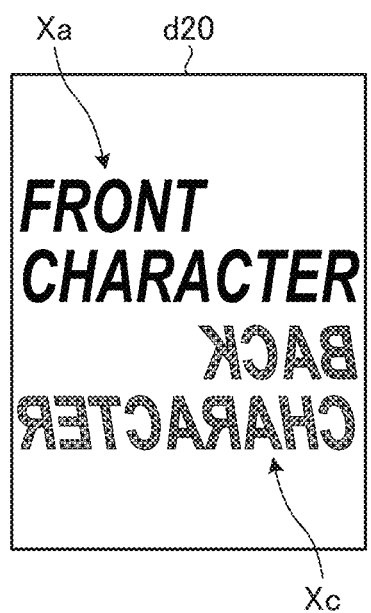
Figure 16D:
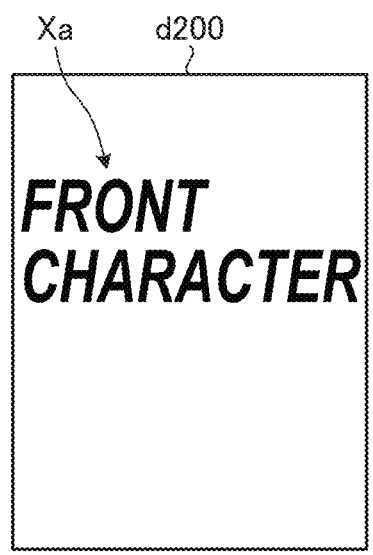

FIGS. 16A to 16D are diagrams illustrating examples of images of the second output image data d200 after correction. FIG. 16A illustrates the first side 100a of the document 100, and FIG. 16B illustrates the back side 100b of the document 100. FIG. 16C illustrates an image of the second image data d20 read by irradiating the first side 100a of the document 100 with visible light and near-infrared light. FIG. 16D illustrates an image of the second output image data d200 after correction. As illustrated in FIG. 16D, it is possible to acquire the second output image data (near-infrared light image) without back side reflection.

Figure 17:
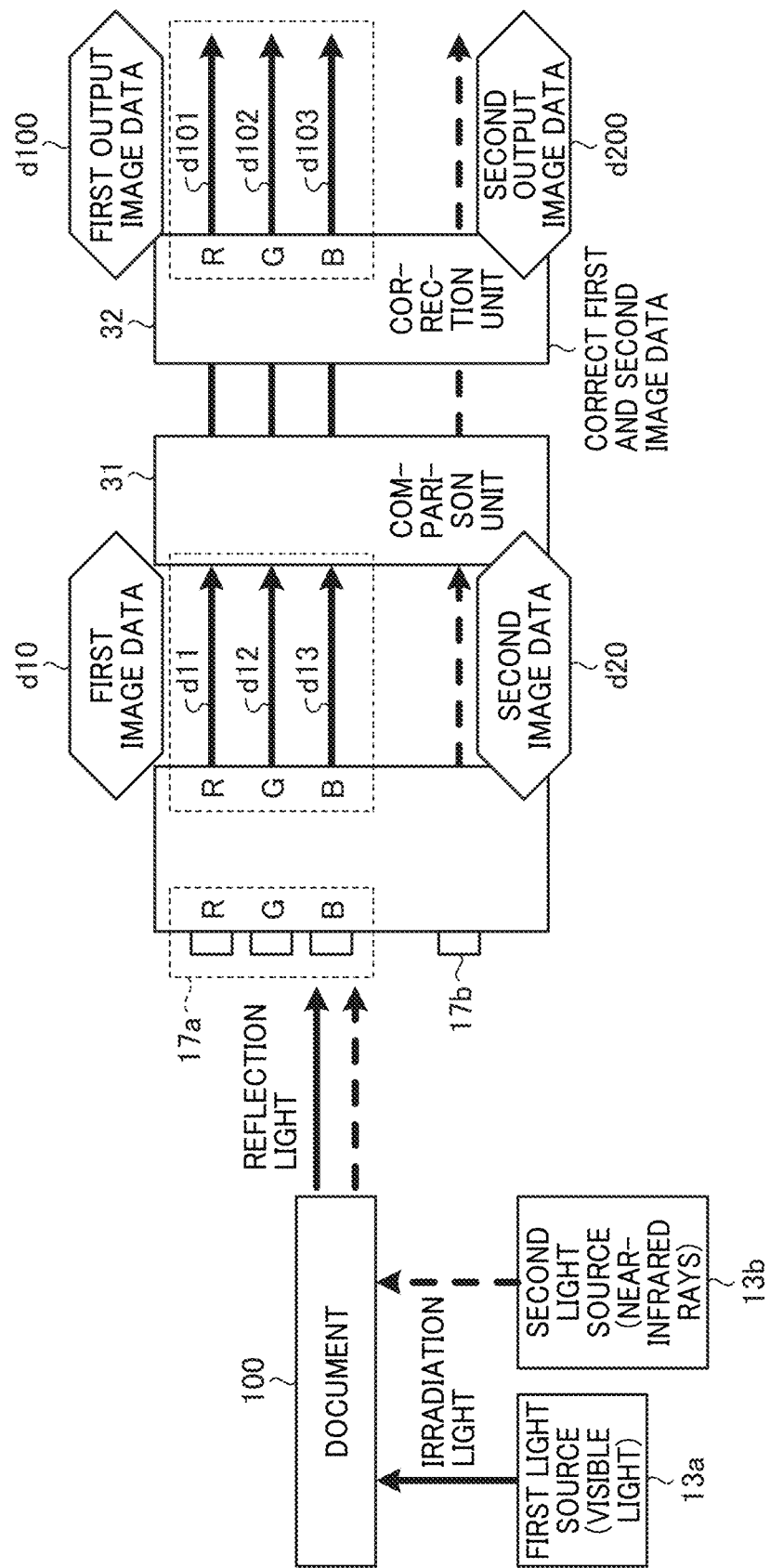
FIG. 17 is a diagram illustrating an example of a configuration for simultaneously outputting a visible light image in which back side reflection is suppressed and a near-infrared image in which back side reflection is suppressed.

FIG. 17 is a diagram illustrating an example of a configuration for simultaneously outputting a visible light image in which back side reflection is suppressed and a near-infrared image in which back side reflection is suppressed. In the configuration of the second modification illustrated in FIG. 11, the correction unit 32 simultaneously corrects the first image data d10 and the second image data d20, and simultaneously outputs the first output image data d100 and second output image data d200 after correction.

Figure 18A:
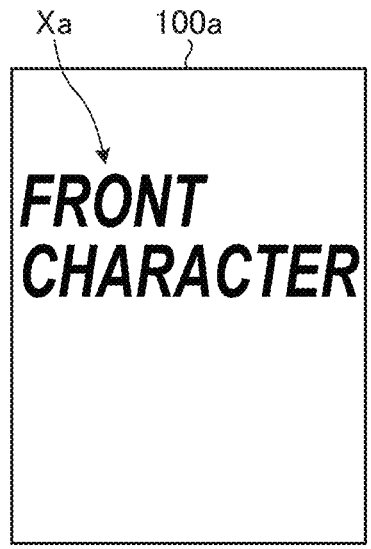
FIGS. 18A to 18D are diagrams illustrating examples of respective images of the first output image data after correction and the second output image data after correction.
Figure 18B:
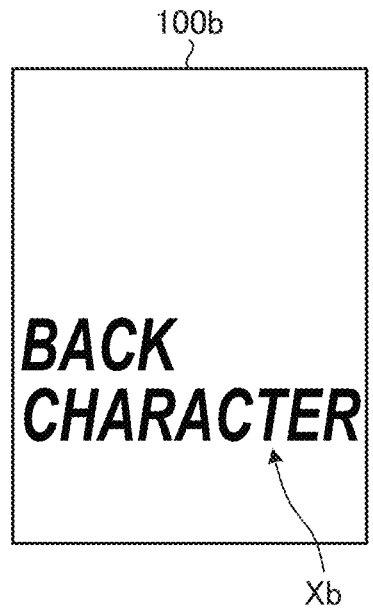
Figure 18C:
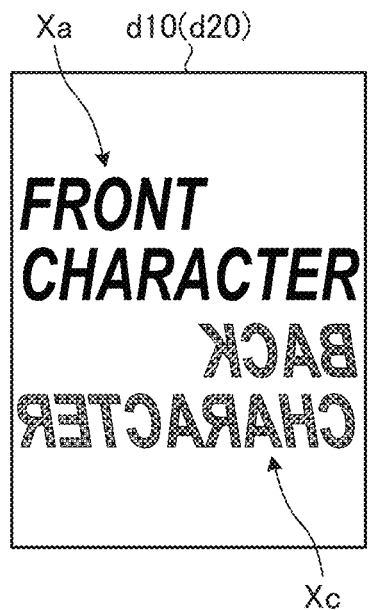
Figure 18D:
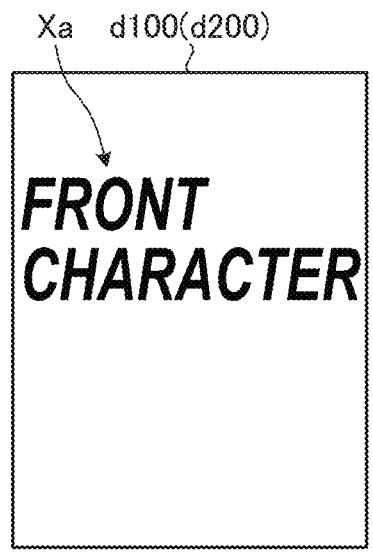

FIGS. 18A to 18D are diagrams illustrating examples of respective images of the first output image data d100 after correction and the second output image data d200 after correction. FIG. 18A illustrates the first side 100a of the document 100, and FIG. 18B illustrates the back side 100b of the document 100. FIG. 18C illustrates images of the first image data d10 and second image data d20 read by irradiating the first side 100a of the document 100 with visible light and near-infrared light. FIG. 18D illustrates images of the first output image data d100 after correction and second output image data d200 after correction. As illustrated in FIG. 18D, it is possible to simultaneously acquire the first output image data d100 and second output image data d200 without back side reflection.

With such a configuration, it is possible to output a visible light image and a near-infrared image without back side reflection in one reading operation (scan).

Third Modification

A unit for avoiding erroneous correction in a case where a color material having a transmission characteristic with respect to near-infrared light such as color toner is present on both sides of a document will be described.

Figure 19A:
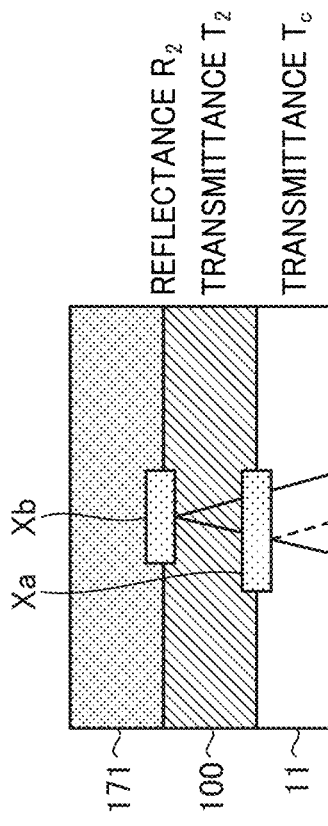
FIGS. 19A and 19B are diagrams illustrating examples of respective reflection light intensities of irradiation light of the first light source and the second light source in a case where characters are present on both sides of a document.
Figure 19B:

FIGS. 19A and 19B are diagrams illustrating examples of respective reflection light intensities of irradiation light of the first light source 13a and the second light source 13b in a case where characters are present on both sides of the document 100. FIG. 19A illustrates an example of a case where light of the first light source 13a is applied, and FIG. 19B illustrates an example of a case where light of the second light source 13b is applied.

As illustrated in FIG. 19A, in a case where characters Xa and Xb of a color material having a transmission characteristic with respect to near-infrared light are present, when the first light source 13a emits visible light, the light is absorbed by the characters Xa on the first side 100a, and the reflection light intensity becomes substantially 0 (FIG. 19A). On the other hand, when the second light source 13b emits near-infrared light, the light is hardly absorbed by the characters Xa. That is, as illustrated in FIG. 19B, the reflection light in this case includes light Q12 reflected from the characters Xa and light Q13 transmitted through the document 100 and reflected from the background plate 171. As a result, there occurs a difference in reflection light intensity between the first image data d10 and the second image data d20.

In a case where the absolute value of the level difference between the first image data d10 and the second image data d20 is equal to or more than the first threshold, it is considered that there is back side reflection in the corresponding pixels, and the correction process is performed. However, in a case where the level difference occurs in the pixels where the characters Xa are present on the first side 100a, it is desirable that the comparison unit 31 and the correction unit 32 perform a process of avoiding erroneous correction of the pixels.

For example, in the comparison unit 31, a second threshold is provided, and target pixels having pixel values below the second threshold in the first image data d10 are excluded from the correction target. The second threshold takes a value with which erroneous correction is caused due to a level difference when the color material is present on the first side 100a of the document 100.

Figure 20:
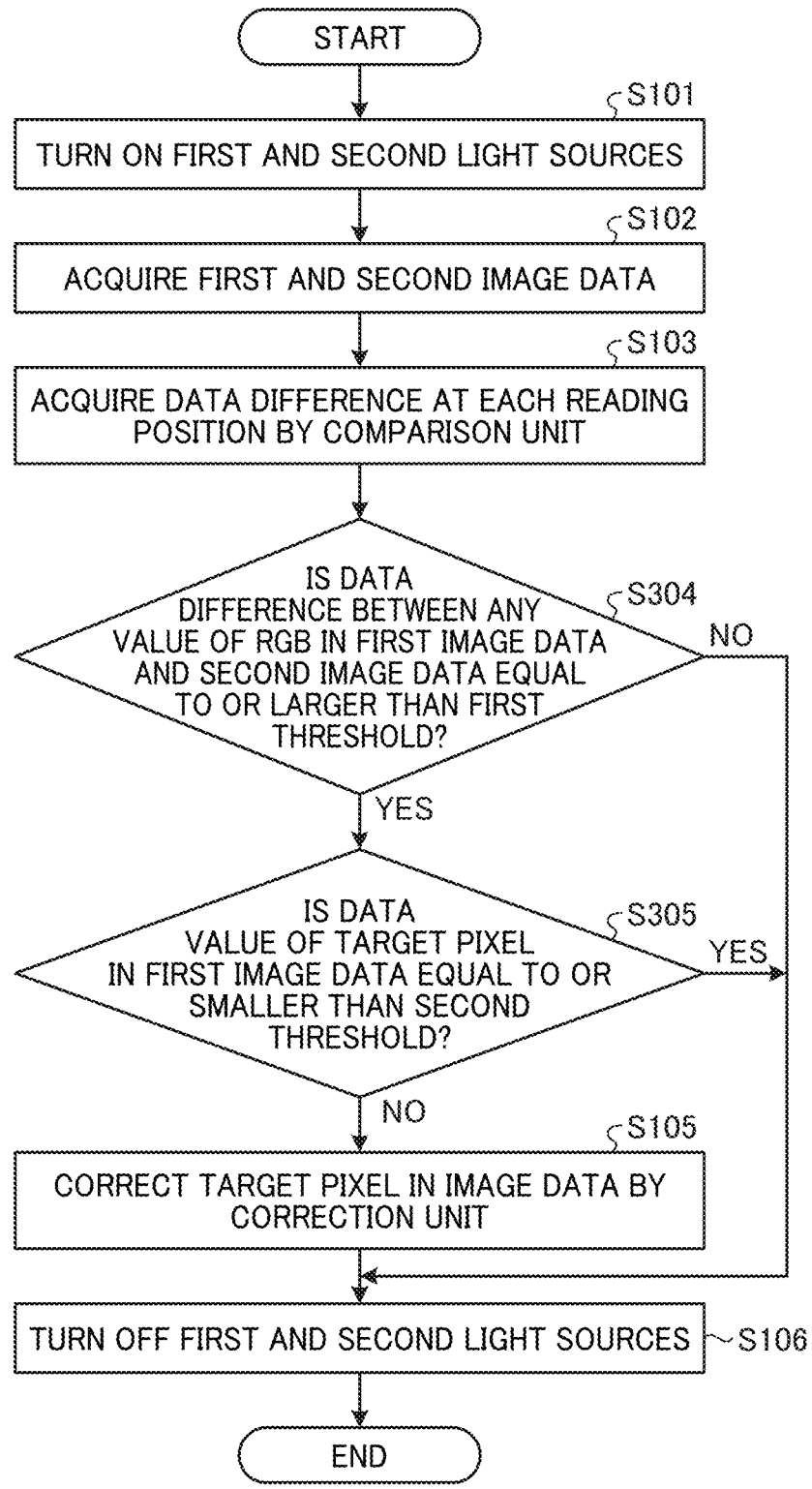
FIG. 20 is a flowchart of an example of one reading operation performed by a reading device in a third modification.

FIG. 20 is a flowchart of an example of one reading operation performed by the reading device 1 in the third modification. In the flow illustrated in FIG. 20, the same reference numerals are assigned to the same steps as those of the preceding flow (see FIG. 9). S101 to S103 illustrated in FIG. 20 correspond to S101 to S103 of the flow illustrated in FIG. 9, and thus redundant description thereof is omitted.

After S103, the reading device 1 determines b the comparison unit 31 whether the difference in pixel value between a pixel in the first image data d10 and the corresponding pixel in any one of the R image data d11, the G image data d12, and the B image data d13 included in the second image data d20 is greater than or equal to the first threshold (S304). The determination is sequentially performed for each pixel or for each predetermined pixel group. In a case where the data difference between any of the RGB pixel values and the pixel value of the second image data is equal to or larger than the first threshold (Yes in S304), the comparison unit 31 of the reading device 1 further determines whether the pixel value of the target pixel in the first image data d10 is equal to or smaller than the second threshold (S305).

In a case where the pixel value is not equal to or less than the second threshold (No in S305), the reading device 1 detects the pixel as a back side reflection area, and the correction unit 32 corrects the respective pixels in the image data in the colors corresponding to the pixel that is equal to or larger than the first threshold (S105). After all the corrections are completed, the reading device 1 turns off the first light source 13a and the second light source 13b, and ends the process (S106).

In a case where the data difference is less than the threshold in all the pixels (No in S304), or in a case where the pixel value of the target pixel is equal to or less than the second threshold (Yes in S305), the image has no back side reflection, and thus the reading device 1 turns off the first light source 13a and the second light source 13b without performing the correction (S105), and ends the process (S106).

Figure 21A:
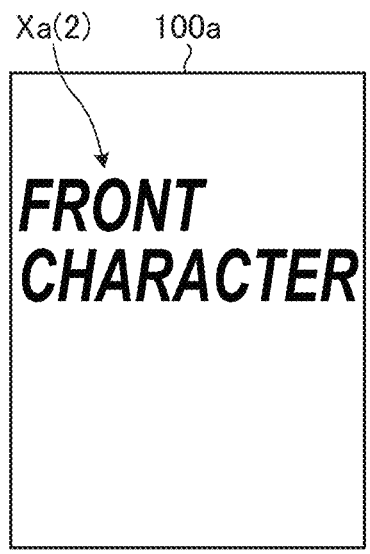
FIGS. 21A to 21D are diagrams illustrating images of output image data when correction is performed.
Figure 21B:
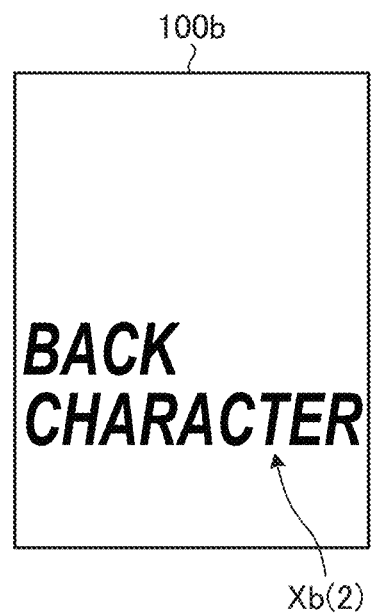

FIGS. 21A to 21D are diagrams illustrating images of output image data when the correction of the third modification is performed. FIG. 21A illustrates the first side 100a of the document 100, and FIG. 21B illustrates the back side 100b of the document 100. The first side 100a and second side 100b of the document 100 illustrated in FIGS. 21A and 21B respectively include characters Xa(R) and characters Xb(R) formed of a color material having a transmission characteristic with respect to the light of the second light source 13b.

Figure 21C:
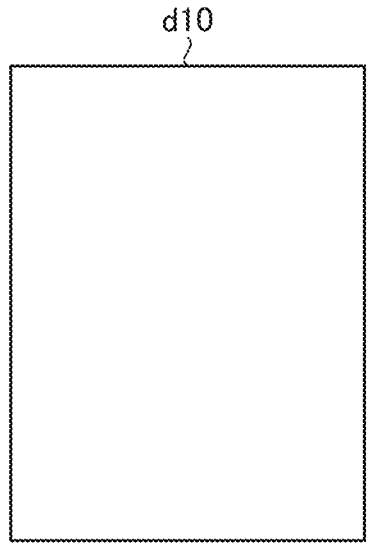
Figure 21D:
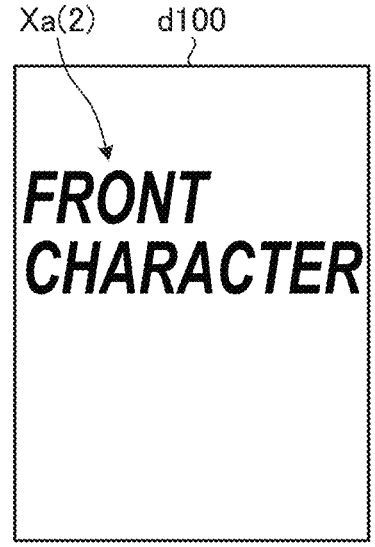

FIG. 21C illustrates an image of the first output image data d100 to which the correction of the third modification is not performed and the correction is performed only by the determination based on the first threshold. FIG. 21D illustrates an image of the first output image data d100 to which the correction of the third modification is performed.

As illustrated in FIG. 21C, when the correction is performed only by the determination based on the first threshold, even the characters Xa on the first side 100a are removed, resulting in erroneous correction. However, as illustrated in FIG. 21D, when the correction of the third modification is performed, the removal of the characters Xa from the first side 100a is avoided, and only the back side reflection can be appropriately removed.

As described above, by excluding the target pixels having data values less than the second threshold in the first image data d10 from the correction target, it is possible to eliminate the erroneous correction caused by the level difference between the first image data d10 and the second image data d20 generated when the color toner is present on the first side 100a of the document 100. Therefore, this back side reflection removal unit can also be applied to a color material such as a color toner having a transmission characteristic with respect to light of the second light source 13b. Therefore, the present technology can also be applied to a color material such as a color toner having a transmission characteristic with respect to near-infrared light.

Fourth Modification

A modification of the operation flow of the reading device 1 will be described. The comparison and correction processing of the image data obtained from the first reading unit and the second reading unit may be performed line by line in parallel with the scan operation.

Figure 22:
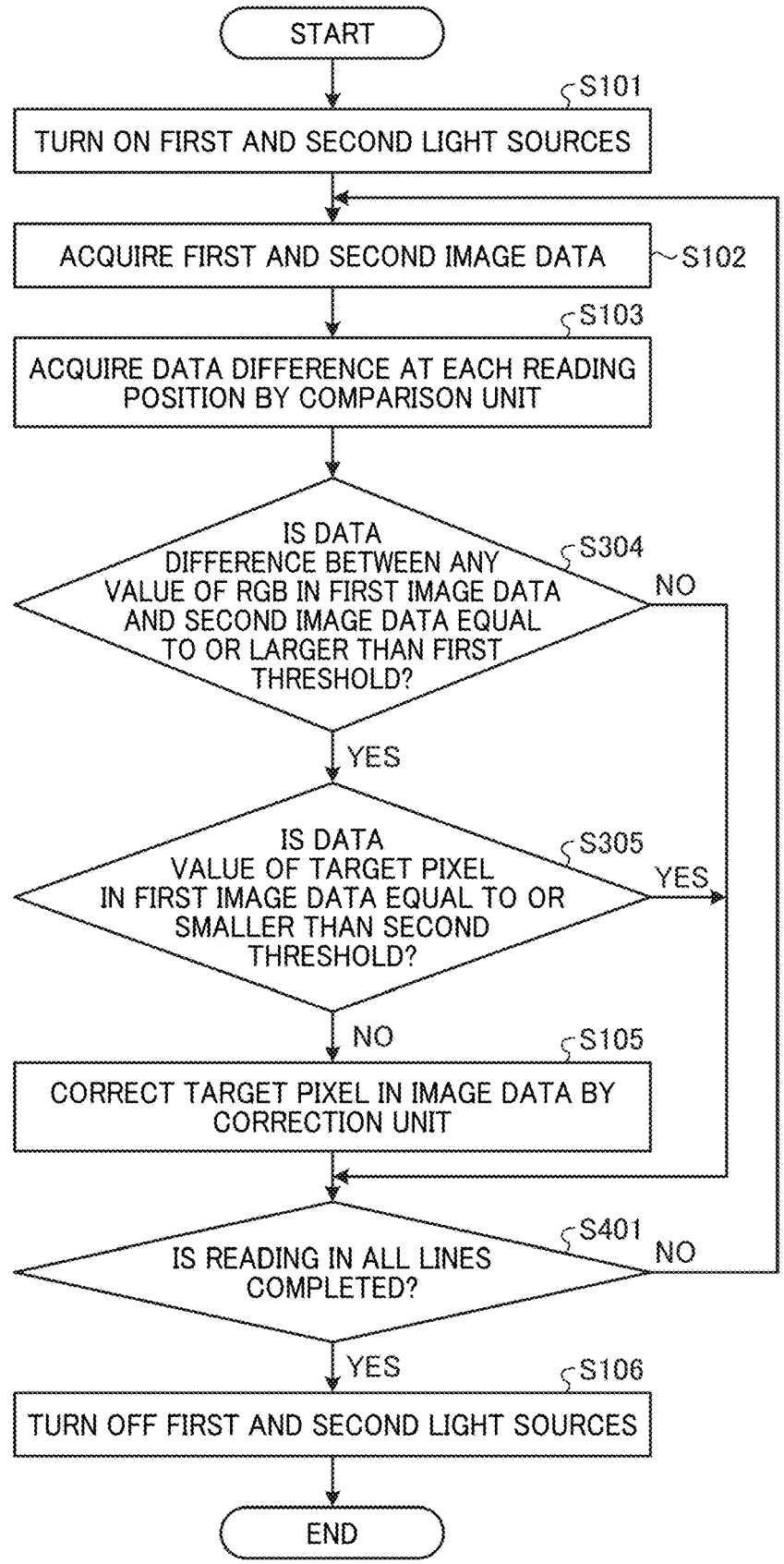
FIG. 22 is a flowchart of an example of one reading operation performed by a reading device in a fourth modification.

FIG. 22 is a flowchart of an example of one reading operation performed by a reading device in the fourth modification. The flow illustrated in FIG. 22 is obtained by adding S401 to the flow illustrated in FIG. 20.

In S401, the reading device 1 determines whether S102 to S105 have been performed on all the lines. When the processing is not completed on all the lines (No in S401), the reading device 1 repeats S102 and subsequent steps on the lines that have not been processed.

When the processing is completed on all the lines (Yes in S401), the reading device 1 turns off the first light source 13a and the second light source 13b, and ends the process (S106).

As described above, in the operation flow of the fourth modification, the reading device 1 performs the comparison and correction processing in units of lines, and every time one line is completed, checks whether the line is the final line. When the processing is completed on the final line, the reading device 1 ends the comparison and correction processing and outputs the corrected image.

This shortens the processing time for removing back side reflection after the reading operation, and allows higher-speed processing.

Fifth Modification

A background detection unit that detects and stores background data of the document 100 may be provided in a preceding stage of the comparison unit 31, thereby to suppress back side reflection on the basis of the background data detected by the background detection unit.

Figure 23:
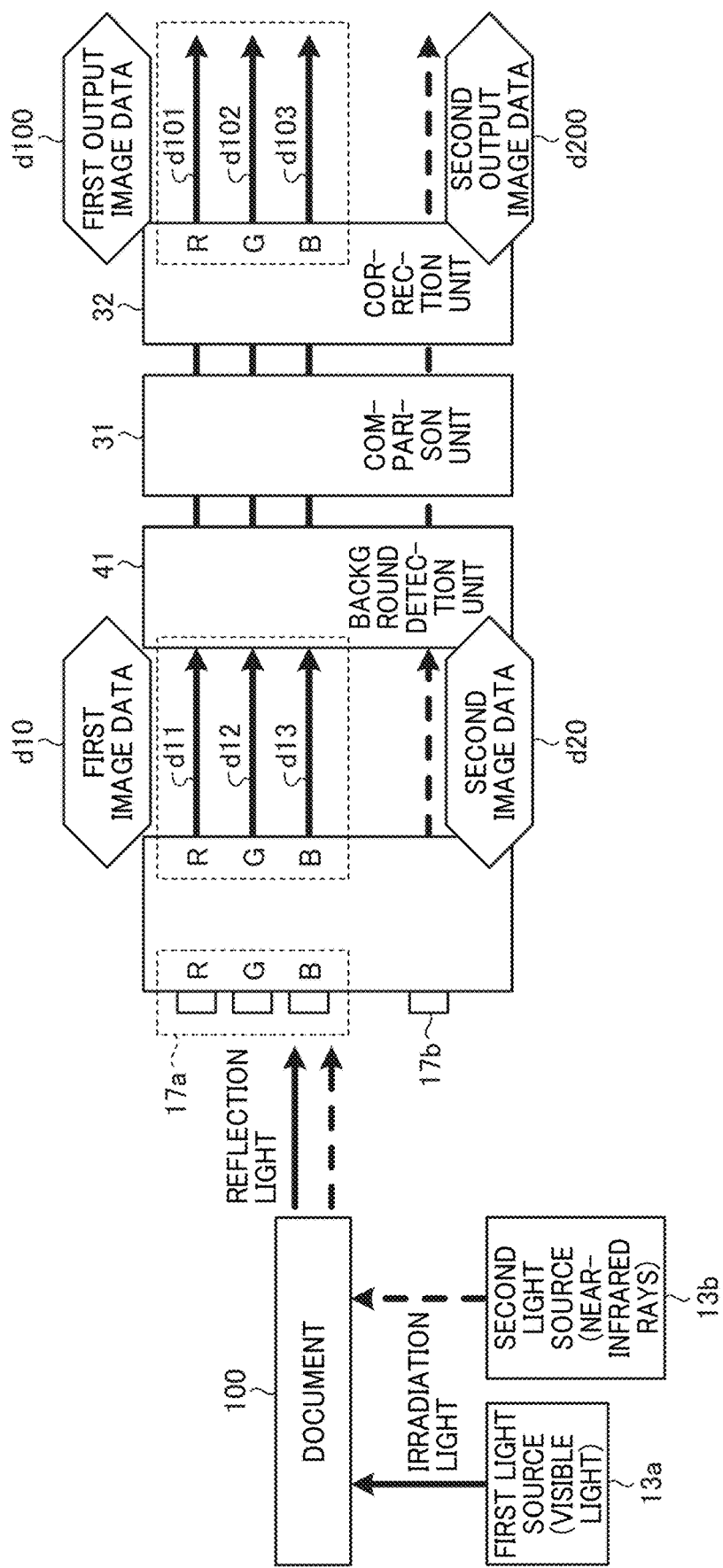
FIG. 23 is a diagram illustrating an example of a configuration of a reading device for suppressing back side reflection according to a fifth modification.

FIG. 23 is a diagram illustrating an example of a configuration of the reading device 1 for suppressing back side reflection according to a fifth modification. As illustrated in FIG. 23, in the configuration of the fifth modification, a background detection unit 41 is provided in front of the correction unit 32.

The background detection unit 41 detects background data (pixel value) of the document sheet background of the document 100 from the first image data d10 or the second image data d20 output from the first reading unit 17a or the second reading unit 17b, and stores the background data in the memory. The background data of the document 100 is stored in the memory until the scan operation is completed, and the correction unit 32 performs correction to replace the pixel value of the target pixel determined to be back side reflection by the comparison unit 31 in the subsequent stage with the background data.

Figure 24A:
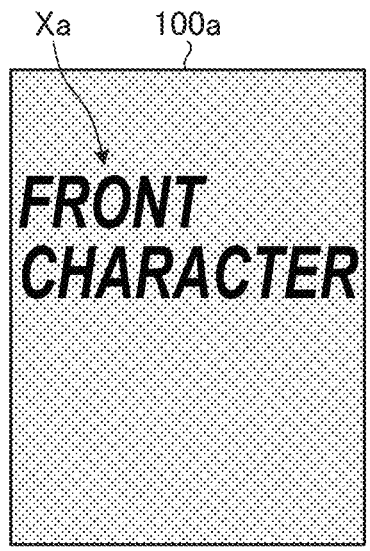
FIGS. 24A to 24D are diagrams illustrating examples of images of first output image data after correction.
Figure 24B:
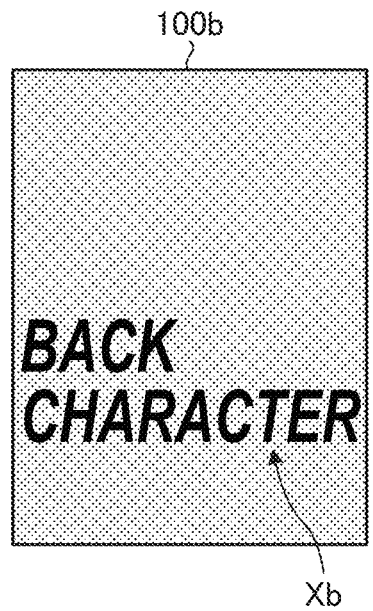

FIGS. 24A to 24D are diagrams illustrating examples of images of the first output image data d100 after correction. FIG. 24A illustrates the first side 100a of the document 100, and FIG. 24B illustrates the back side 100b of the document 100. The sheet background of the document 100 varies depending on the type. It is generally a white background, but some have other colors. FIGS. 24A and 24B illustrate the sheet background in color.

Figure 24C:
Figure 24D:
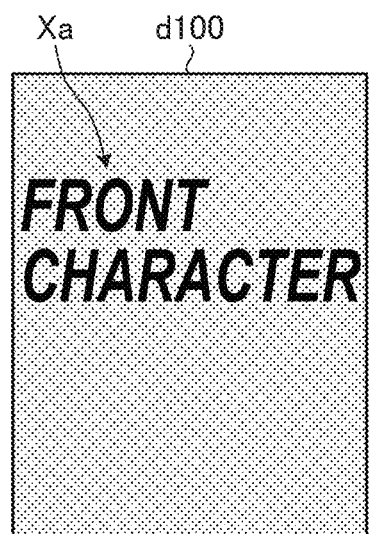

FIG. 24C illustrates an image of the first output image data d100 in a case where correction is performed without passing through the background detection unit 41. FIG. 24D illustrates an image of the first output image data d100 in a case where correction is performed through the background detection unit 41.

Referring to FIG. 24C, replacement is performed with predetermined background data that is not the background data of the document 100. For example, since the document sheet is generally white, when replacement is performed with white background data, the back side reflection remains in a case where the background of the document actually read is in another color. As can be seen from the comparison with FIGS. 24C and 24D, in the case of the document 100 illustrated in FIGS. 24A and 24B as an example, the area of the characters Xc reflected on the back side is replaced with the same pixel value as the background of the read document 100, whereby the back side reflection is completely removed.

In this way, by providing the background detection unit 41, the portion detected as back side reflection becomes the same as the document background, and a more natural image after the removal of the back side reflection can be acquired.

Sixth Modification

A member (referred to as a document background member) that absorbs light of the second light source 13b may be configured as the background plate 171.

FIG. 25 is a diagram illustrating an example of a configuration of the reading device 1 for suppressing back side reflection according to a sixth modification. As illustrated in FIG. 25, in the configuration of the sixth modification, the background plate 171 is used as the document background member 171b.

Figure 26A:
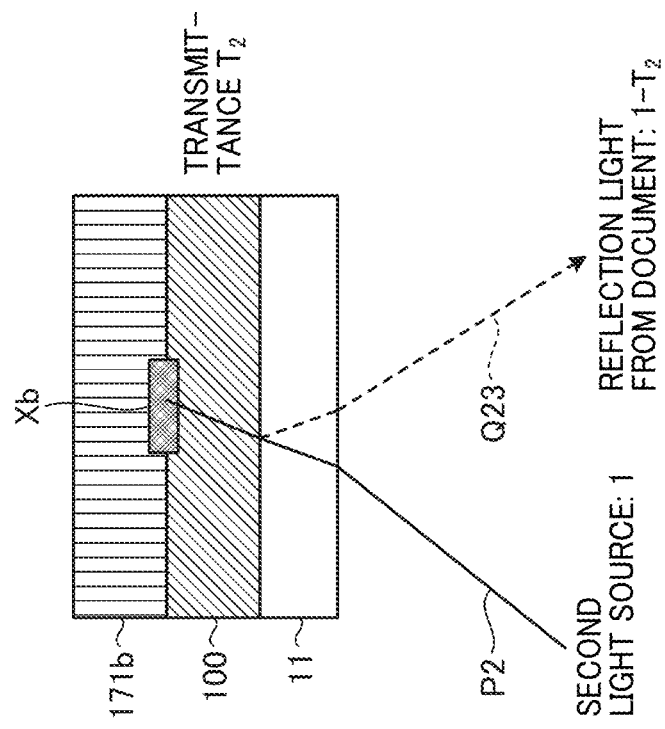
FIGS. 26A and 26B are diagrams illustrating examples of respective reflection light intensities of irradiation light of the second light source in a case where characters are not present on a second side of a document and in a case where characters are present on the second side of the document.
Figure 26B:
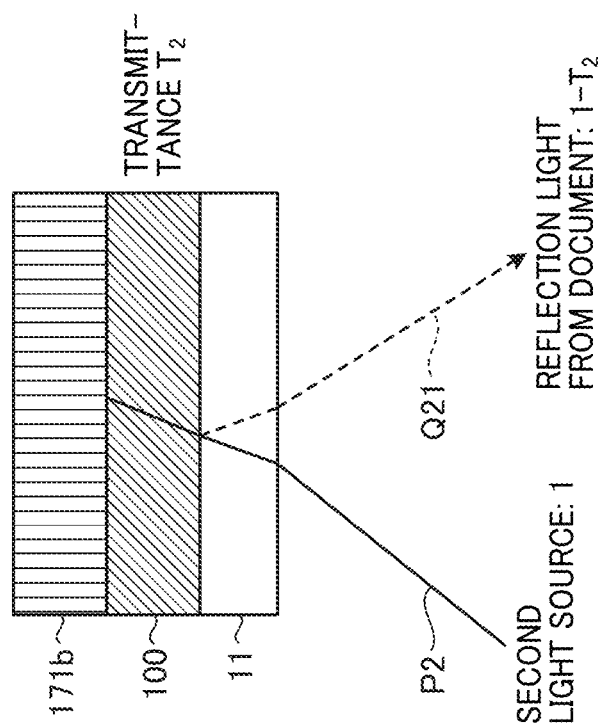

FIGS. 26A and 26B are diagrams illustrating examples of respective reflection light intensities of irradiation light of the second light source 13b in a case where the characters Xb are not present on the second side 100b of the document 100 and in a case where the characters Xb are present on the second side 100b of the document 100. FIG. 26A illustrates a case where the characters Xb are not present on the second side 100b, and FIG. 26B illustrates a case where the characters Xb are present on the second side 100b.

As illustrated in FIG. 26A, in a case where the characters Xb are not present on the second side 100b, the irradiation light P2 of the second light source 13b is transmitted through the document 100 and then absorbed by the document background member 171b. In addition, as illustrated in FIG. 26B, also in a case where the character Xb are present on the second side 100b, the irradiation light P2 of the second light source 13b is transmitted through the document 100 and then absorbed by the characters Xb. Therefore, the amounts of the reflection light Q21 and the reflection light Q23 of the irradiation light of the second light source 13b are substantially the same regardless of the presence or absence of the characters Xb on the second side 100b, so that the second image data d20 is acquired as an image with no back side reflection.

The irradiation light of the first light source 13a, which is visible light, is reflected by the document background member 171b as in the case of a normal white background plate, and is acquired as an image with back side reflection.

In the configuration of the sixth modification, in a case where the first image data d10 and the second image data d20 are compared by the comparison unit 31, the first image data d10 with back side reflection and the second image data d20 without back side reflection can be compared. Therefore, the threshold for determining back side reflection can be lowered, thereby to improve the removal performance of back side reflection.

Seventh Modification

A mode setting unit may be provided as a setting unit for setting, in the reading device 1, whether or not to perform correction for removing back side reflection before the user starts reading.

FIG. 27 is a diagram illustrating an example of a configuration of the reading device 1 for suppressing back side reflection according to a seventh modification. As illustrated in FIG. 27, a mode setting unit 51 is provided in the configuration of the seventh modification.

The mode setting unit 51 receives an instruction on whether or not to remove back side reflection from the user on a setting screen or the like. In a case of the instruction being for removing back side reflection, the mode setting unit 51 sets the mode setting 1 to the background detection unit 41, the comparison unit 31, and the correction unit 32. In a case of the instruction being not for removing back side reflection, the mode setting unit 51 sets a mode other than the mode setting 1 to these units. The mode setting 1 is an example, and the mode setting is not limited thereto.

Figure 28:
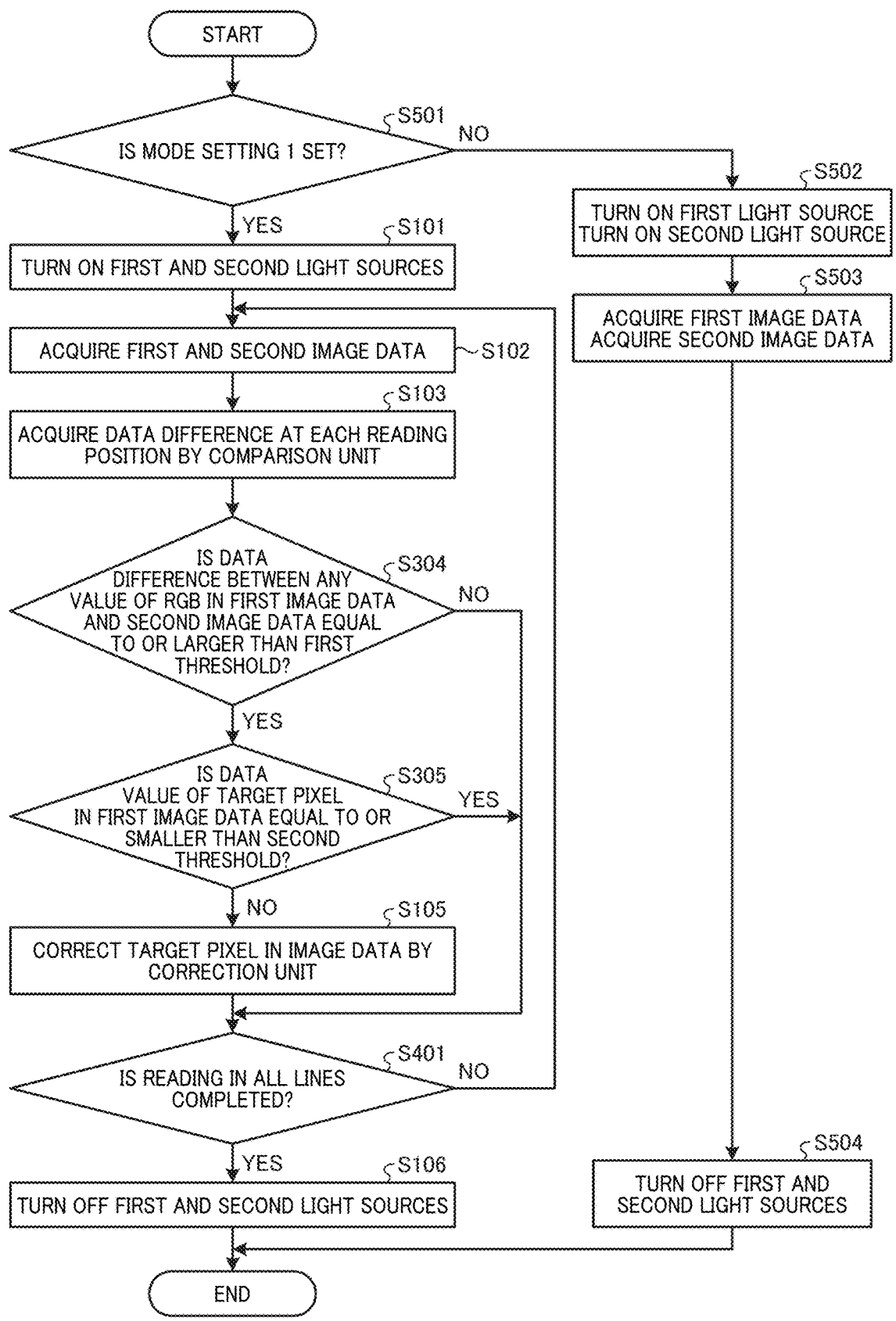
FIG. 28 is a flowchart of an example of one reading operation performed by a reading device in the seventh modification.

FIG. 28 is a flowchart of an example of one reading operation performed by the reading device 1 in the seventh modification. The flow illustrated in FIG. 28 is obtained by adding S502 to S504 to the flow illustrated in FIG. 22. The setting mode is switched in S502 to S504.

Specifically, the reading device 1 first determines whether the mode setting 1 is set (S501). In a case where the mode setting 1 is set (Yes in S501), the reading device 1 performs the procedure of removing back side reflection in S101 to S106 as described above.

When the mode setting 1 is not set (No in S501), the reading device 1 performs the procedures of S502 to S504 without removing back side reflection. That is, the reading device 1 turns on the first light source 13a and the second light source 13b (S502), acquires the first image data d10 and the second image data d20 (S503), and turns off the first light source 13a and the second light source 13b (S504).

With this configuration, it is possible to acquire only the first image data d10 and the second image data d20 by the first light source 13a and the second light source 13b according to the mode set by the mode setting unit 51, and omit the comparison by the comparison unit 31 and the correction by the correction unit 32. Furthermore, in a case where only a visible light image or only an infrared light image is required, it is possible to perform reading by turning on only one of the light sources. As a result, in the case of using the document 100 that does not cause back side reflection such as a thick paper document, unnecessary processing, for example, turning on the other light source, reading light of the other light source, comparison, correction, and the like can be omitted, so that it is possible to shorten the reading time and reduce power consumption.

Eighth Modification

A document transmittance detection unit that detects a document transmittance may be provided, and the mode of the mode setting unit 51 may be automatically switched according to the document transmittance detected by the document transmittance detection unit.

Figure 29:
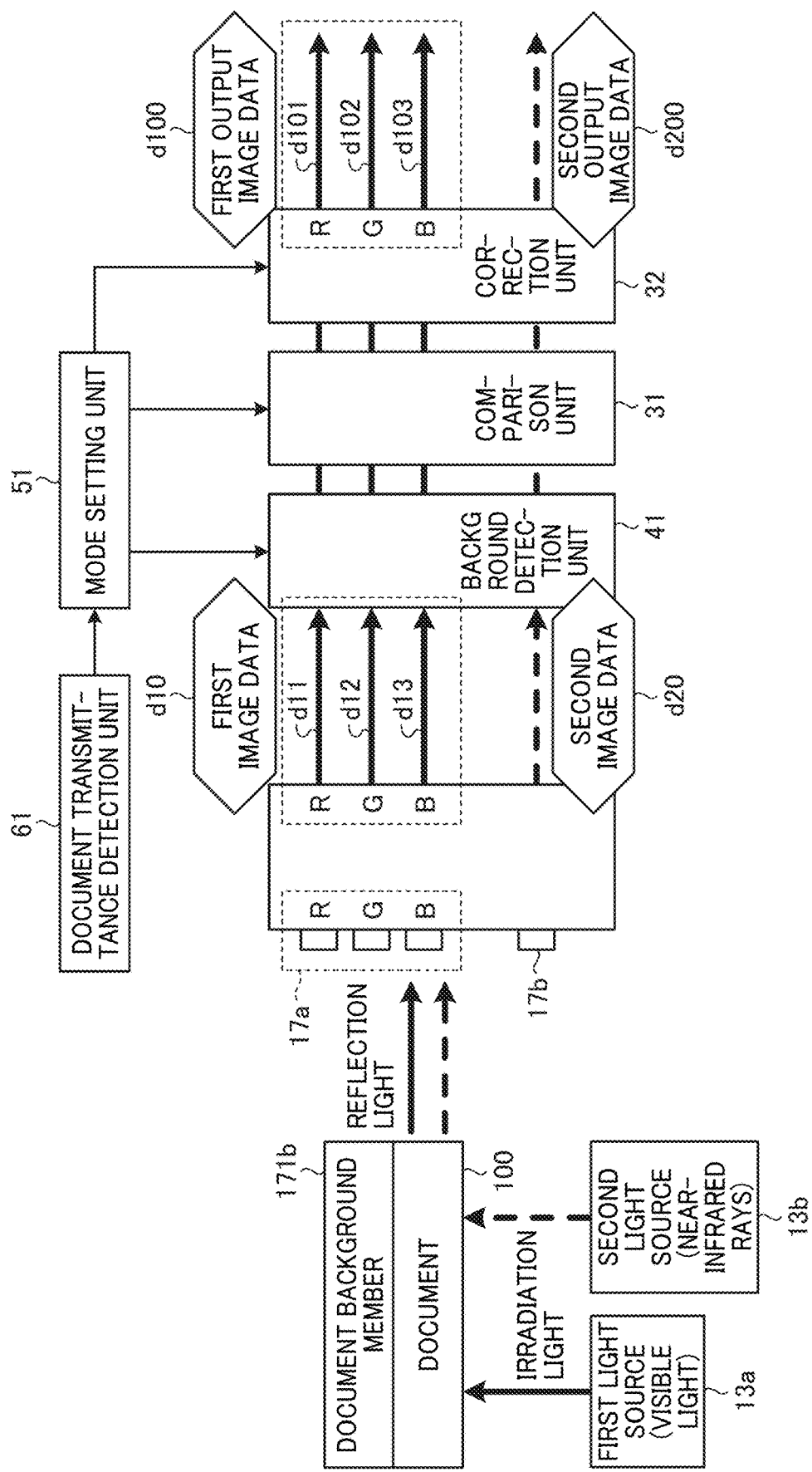
FIG. 29 is a diagram illustrating an example of a configuration of a reading device for suppressing back side reflection according to an eighth modification.

FIG. 29 is a diagram illustrating an example of a configuration of the reading device 1 for suppressing back side reflection according to an eighth modification. As illustrated in FIG. 28, in the configuration of the eighth modification, a document transmittance detection unit 61 that outputs a mode switching signal to the mode setting unit 51 is provided.

The document transmittance detection unit 61 detects the light transmittance of the document 100 as the document transmittance by irradiating the document 100 with light or the like. Then, in a case where the detected document transmittance is equal to or greater than a certain value, for example, the document transmittance detection unit 61 outputs the mode switching signal of the mode setting 1 to the mode setting unit 51, that is, applies the removal of back side reflection. In addition, in a case where the document transmittance is less than the certain value, the document transmittance detection unit 61 outputs a mode switching signal for canceling the mode setting 1 to the mode setting unit 51, that is, determines the document as causing no back side reflection and does not apply the removal of back side reflection. The mode setting unit 51 sets the specified mode to the background detection unit 41, the comparison unit 31, and the correction unit 32 according to the mode switching signal.

Figure 30:
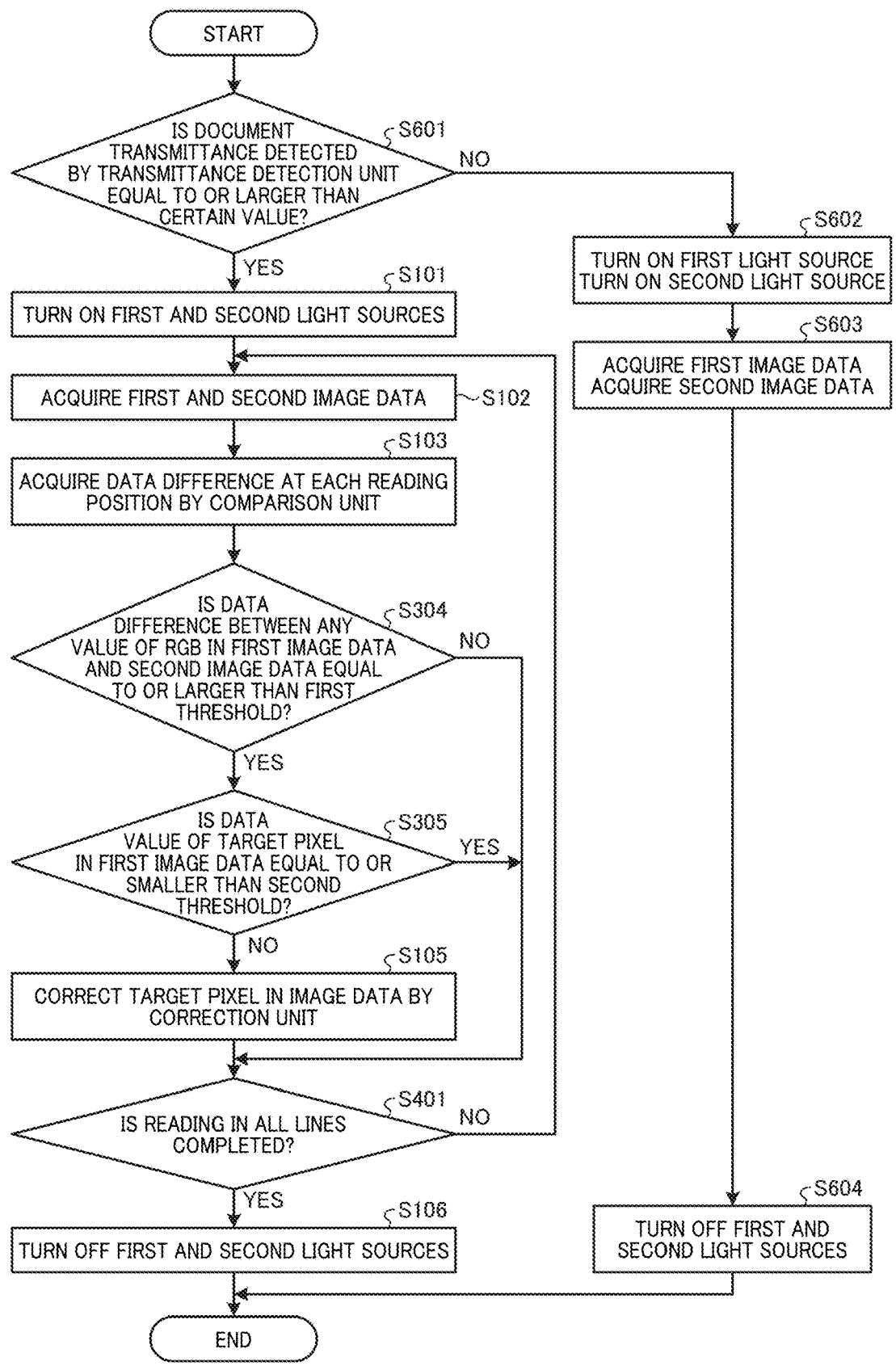
FIG. 30 is a flowchart of an example of one reading operation performed by a reading device in the eighth modification.

FIG. 30 is a flowchart of an example of one reading operation performed by the reading device 1 in the eighth modification. In the flow illustrated in FIG. 30, steps S501 to S504 in the flow illustrated in FIG. 28 are replaced with S601 to S604.

Specifically, the reading device 1 first determines whether the transmittance detection unit 61 has detected a document having a document transmittance of a certain value or more (S601). In a case where the transmittance detection unit 61 has detected a document having a document transmittance of a certain value or more (Yes in S601), the reading device 1 performs the procedure of removing back side reflection in S101 to S106 described above with the setting of the mode setting 1.

In a case where the transmittance detection unit 61 has not detected a document having a document transmittance of a certain value or more (No in S601), the reading device 1 performs the procedures of S602 to S604 with the setting in which the mode setting 1 is canceled, that is, without performing the removal of back side reflection. Since S602 to S604 are similar to S502 to S504, the description thereof will be omitted.

As a result, the user can start reading without setting the mode, thereby resulting in improvement of usability.

Note that there is a case where an image acquired by light other than visible light is used as an output image in order to remove ruled lines and impressions for the purpose of improving readability. In the embodiment and modifications described above, it is possible to cope with both outputs of the first output image data generated from the first image data acquired based on visible light and the second output image data generated from the second image data acquired with light having a transmittance different from the visible light.

As described above, the reading device 1 according to the exemplary embodiment and modifications can be adapted to both the visible light image and the invisible light image, and can acquire the image from which back light reflection has been removed in a short time.

Second Embodiment

Figure 31:
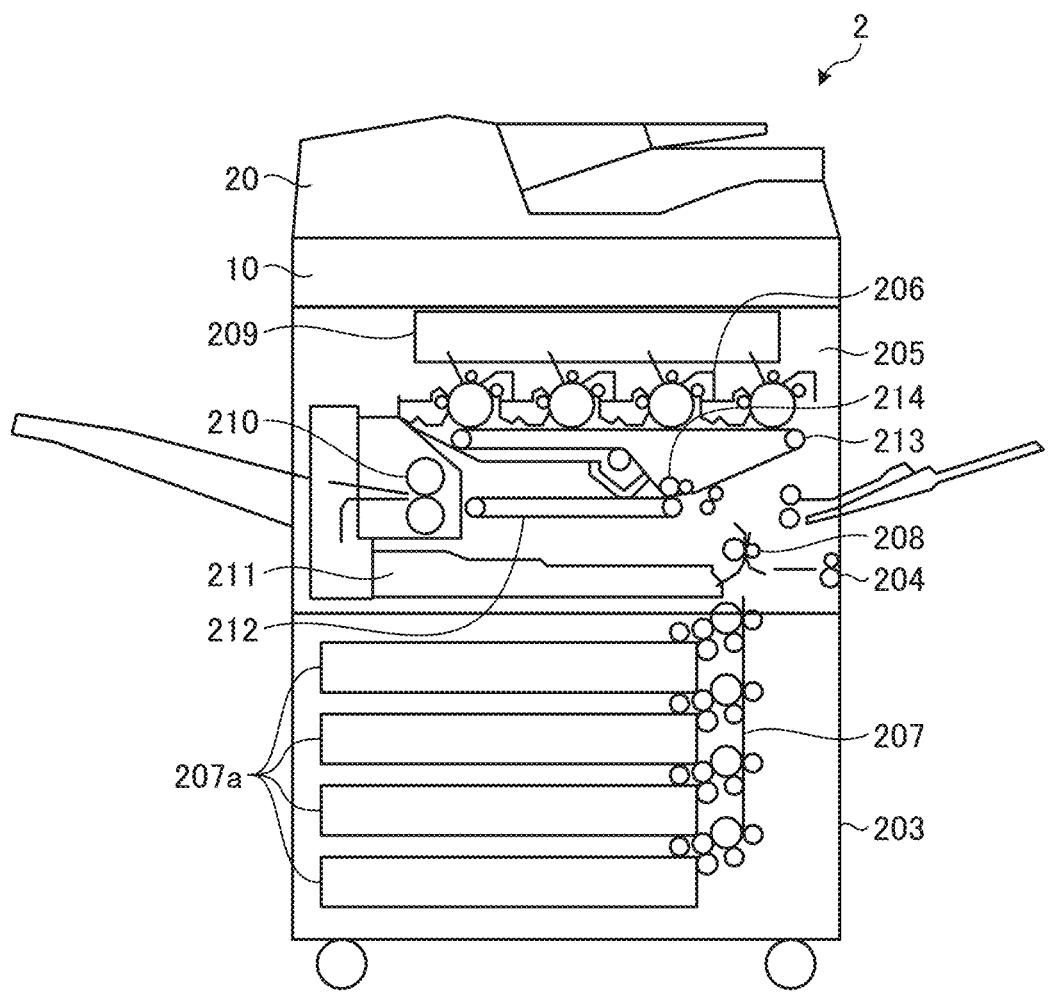
FIG. 31 is a diagram illustrating a configuration of an example of an image forming apparatus according to a second embodiment.

FIG. 31 is a diagram illustrating a configuration of an example of an image forming apparatus according to a second embodiment. In FIG. 31, an image forming apparatus 2 is an image forming apparatus generally called a multifunction peripheral (MFP) having at least two functions of a copy function, a printer function, a scanner function, and a facsimile function.

The image forming apparatus 2 includes a reading device main body and an ADF 20, which constitute a reading device, and an image forming device 203 below the reading device main body 10 and the ADF 20.

The ADF 20 feeds a document, reads a side of the document to be read at a reading position (reading window), and ejects the document to an output tray. The reading device main body 10 reads the side of the document to be read at the reading position. The ADF 20 is the ADF 20 according to the first embodiment (see FIG. 1), and the reading device main body 10 is the reading device main body 10 according to the first embodiment (see FIG. 1). The ADF 20 and the reading device main body 10 have already been described in relation to the first embodiment. Therefore, further description of the ADF 20 and the reading device main body 10 is omitted.

In FIG. 31, in order to describe the internal configuration of the image forming device 203, an external cover is removed so that the internal configuration can be understood. The image forming device 203 prints a document image read by the reading device main body 10. The image forming device 203 includes a bypass feeding roller pair 204 through which a recording medium is manually inserted and a recording sheet feeder 207 that supplies a recording medium. Here, the recording sheet is an example of a "medium". The recording sheet feeder 207 includes an assembly that sends out recording media one by one from vertically-aligned sheet trays 207a. The recording sheet thus fed is sent to a secondary transfer belt 212 via a registration roller pair 208.

Onto the recording sheet conveyed on the secondary transfer belt 212, a transfer device 214 transfers a toner image from an intermediate transfer belt 213.

In addition, the image forming device 203 includes an optical writing device 209, a tandem-system image forming unit (Y, M, C, and K) 205, an intermediate transfer belt 213, the secondary transfer belt 212, and the like. In the image forming process by the image forming unit 205, an image (visible image) written by the optical writing device 209 is formed as a toner image on the intermediate transfer belt 213.

Specifically, the image forming unit (Y, M, C, and K) 205 includes four rotatable photoconductor drums (Y, M, C, and K), and includes an image forming element 206 including a charging roller, a developing device, a primary transfer roller, a cleaner unit, and a static eliminator around each of the photoconductor drums. As the image forming element 206 operates on each photoconductor drum, the image on the photoconductor drum is transferred onto the intermediate transfer belt 213 by each primary transfer roller.

The intermediate transfer belt 213 is in the nips between the photoconductor drums and the corresponding primary transfer rollers and stretched by a drive roller and a driven roller. The toner image primarily transferred onto the intermediate transfer belt 213 is secondarily transferred onto the recording sheet on the secondary transfer belt 212 by a secondary transfer device as the intermediate transfer belt 213 runs. As the secondary transfer belt 212 travels, the recording sheet is conveyed to a fixing device 210, where the toner image is fixed as a color image on the recording sheet. Then, the recording sheet is discharged onto an output tray disposed outside the image forming apparatus. In a case of duplex printing, a reverse assembly 211 reverses the recording sheet upside down and sends out the reversed recording sheet onto the secondary transfer belt 212.

The image forming device 203 is not limited to the one that forms an image by an electrophotographic method as described above. The image forming device 203 may be one that forms an image by an inkjet method.

In addition, the configuration of the reading device may be provided in a subsequent stage of the bypass feeding roller pair 204 through which a recording sheet is manually inserted or in a conveyance path after the recording sheet feeder 207 sends out the recording sheet from the multi-stage recording sheet feeder 207a. In this case, in the event of double feeding of recording sheets or mixture of different types of sheets, it is possible to notify the user of an abnormality before image formation on the recording sheets and to make an emergency stop.

Although the embodiments and modifications of the present invention have been described above, the embodiments and working examples are presented as examples, and are not intended to limit the scope of the invention. These novel embodiments and working examples can be implemented in various other forms, and various omissions, substitutions, and changes can be made without departing from the gist of the invention. These embodiments and working examples are included in the scope and gist of the invention, and are also included in the invention described in the claims and the equivalent scope thereof.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reading device comprising:
a first light source configured to irradiate an object to be read with first light, the first light having a first transmittance with respect to the object;
a second light source configured to irradiate the object with second light, the second light having a second transmittance with respect to the object, and the second transmittance being different from the first transmittance;
a first reading unit configured to read the first light from the object to output first image data;
a second reading unit configured to read the second light from the object to output second image data; and
a comparison unit configured to determine a data difference between the first image data and the second image data in an image area; and
a correction unit configured to correct data of the image area in response to determining the data difference is equal to or larger than a threshold, the data of the image area being corrected in the first image data or the second image data.

2. The reading device according to claim 1, wherein the first light has a first wavelength in a wavelength range of visible light;
the second light has a second wavelength outside of the wavelength range of visible light; and
the first reading unit and the second reading unit are configured to simultaneously read the first light and the second light from the object, and
output the first image data and the second image data.

3. The reading device according to claim 2, wherein the second light source is configured to emit near-infrared light.

4. The reading device according to claim 1, wherein the correction unit is configured to:
correct the data of the image area in the first image data to obtain corrected image data; and
output the corrected image data.

5. The reading device according to claim 1, wherein the correction unit is configured to:
correct the data of the image area in the second image data to obtain corrected image data; and
output the corrected image data.

6. The reading device according to claim 1, wherein the correction unit is configured to:
correct the data of the image area in both the first image data and the second image data to obtain first corrected image data and second corrected image data; and
simultaneously output the first corrected image data and the second corrected image data.

7. The reading device according to claim 1, wherein
the first image data includes two or more colors of color separation data; and
the correction unit is configured to correct the data of the image area in response to determining the data difference between the second image data and any one color among the two or more colors of the color separation data is equal to or larger than the threshold.

8. The reading device according to claim 1, wherein
the data difference is a first data difference, and the image area is a first image area;
the comparison unit is configured to determine a second data difference between the first image data and the second image data in a second image area; and
the correction unit is configured to exclude data of the second image area from data correction in response to determining the second data difference is
equal to or more than the threshold, and
equal to or less than another threshold.

9. The reading device according to claim 1, wherein the comparison unit is configured to determine the data difference in units of lines of the first image data and the second image data during a reading operation of the first reading unit and the second reading unit.

10. The reading device according to claim 1, further comprising:
a background detector configured to detect background data of the object,
wherein the correction unit is configured to correct the data of the image area based on the background data.

11. The reading device according to claim 1, further comprising:
a background member on a back side of the object,
wherein the background member is configured to reflect the first light and absorb the second light emitted.

12. The reading device according to claim 1, further comprising:
a setting unit configured to set whether to perform correction of the data of the image area.

13. The reading device according to claim 12, further comprising:
a transmittance detector configured to detect a light transmittance of the object,
wherein the setting unit is configured to set the correction according to a result of detection by the transmittance detector.

14. An image forming apparatus comprising:
the reading device according to claim 1; and
an image forming device configured to form an image on a recording medium, based on corrected image data obtained by correcting the data of the image area.

15. The reading device according to claim 1, wherein the object is a document having first text on a first side of the document and second text on a second side of the document.

16. The reading device according to claim 15, wherein
the first side of the document is nearer to the first reading unit and the second reading unit than the second side of the document;
the image area includes a reflected image of the second text; and
the correction unit is configured to correct data of the image area to remove the reflected image of the second text.

17. The reading device according to claim 16, wherein
the first light source and the second light source are configured to irradiate the document when the document is co-planar with a background plate; and the reflected image of the second text is based on the first light and the second light reflecting off the background plate.

18. The reading device according to claim 16, wherein
the second transmittance is greater than the first transmittance; and
pixel values of the reflected image of the second text are greater in the second image data than in the first image data.

19. A method comprising:
irradiating an object to be read with first light of a first light source and second light of a second light source, the first light having a first transmittance to the object, the second light having a second transmittance to the object, and the second transmittance being different from the first transmittance;
reading the first light from the object by a first reading unit to output first image data;
reading the second light from the object by a second reading unit to output second image data;
determining a data difference between the first image data and the second image data in an image area; and
correcting data of the image area in response to determining the data difference is equal to or larger than a threshold, the data of the image area being corrected in the first image data or the second image data.

20. A reading device comprising:
a first light source configured to irradiate an object to be read with first light, the first light having a first transmittance with respect to the object;
a second light source configured to irradiate the object with second light, the second light having a second transmittance with respect to the object, and the second transmittance being different from the first transmittance;
a first sensor configured to read the first light from the object to output first image data;
a second sensor configured to read the second light from the object to output second image data; and
processing circuitry configured to
  determine a data difference between the first image data and the second image data in an image area, and
  correct data of the image area in response to determining the data difference is equal to or larger than a threshold, the data of the image area being corrected in the first image data or the second image data.

* * * * *